United States Patent
Anderson et al.

(10) Patent No.: US 11,893,206 B2
(45) Date of Patent: Feb. 6, 2024

(54) TRANSITIONS BETWEEN STATES IN A HYBRID VIRTUAL REALITY DESKTOP COMPUTING ENVIRONMENT

(71) Applicant: AUTODESK, INC., San Francisco, CA (US)

(72) Inventors: Fraser Anderson, Camrose (CA); George Fitzmaurice, Toronto (CA); Tovi Grossman, Toronto (CA); Johann Wentzel, Waterloo (CA)

(73) Assignee: AUTODESK, INC., San Francisco, CA (US)

( * ) Notice: Subject to any disclaimer, the term of this patent is extended or adjusted under 35 U.S.C. 154(b) by 260 days.

(21) Appl. No.: 17/379,640

(22) Filed: Jul. 19, 2021

(65) Prior Publication Data
US 2022/0066620 A1 Mar. 3, 2022

Related U.S. Application Data

(60) Provisional application No. 63/073,899, filed on Sep. 2, 2020.

(51) Int. Cl.
*G06F 3/04815* (2022.01)
*G06F 3/0487* (2013.01)
(Continued)

(52) U.S. Cl.
CPC ........ *G06F 3/04815* (2013.01); *G06F 3/0487* (2013.01); *G06F 3/1423* (2013.01);
(Continued)

(58) Field of Classification Search
CPC ........ G06F 3/011; G06F 3/012; G06F 3/1423; G06F 3/023; G06F 3/0346;
(Continued)

(56) References Cited

U.S. PATENT DOCUMENTS

2013/0257748 A1* 10/2013 Ambrus .................. G01S 17/89
345/173
2016/0027212 A1* 1/2016 Da Veiga ............. G02B 27/017
345/633
(Continued)

OTHER PUBLICATIONS

Arora et al., "SymbiosisSketch: Combining 2D & 3D Sketching for Designing Detailed 3D Objects in Situ", In Proceedings of the 2018 CHI Conference on Human Factors in Computing Systems—CHI '18, ACM Press, https://doi.org/10.1145/3173574.3173759, Apr. 21-26, 2018, pp. 1-15.
(Continued)

*Primary Examiner* — Daniel Samwel
(74) *Attorney, Agent, or Firm* — Artegis Law Group, LLP

(57) ABSTRACT

A hybrid workstation enables a virtual reality (VR) interface, a traditional (TD) interface, and transitions between the interfaces. The VR interface comprises three-dimensional (3D)-based software and hardware components. The TD interface comprises two-dimensional (2D)-based software and hardware components. The state of the hybrid workstation is defined by three parameters comprising interface (VR interface or TD interface), position (seated or standing), and movement (stationary or room-scale). The hybrid workstation detects a transition from a current state to a next state upon determining that any of the three parameters have changed. The hybrid workstation then determines a transition response based on the particular transition that is detected. The transition response comprises a set of operations that are performed on the VR interface and/or the TD interface that mitigate the disruption and inefficiency caused when the particular transition occurs.

20 Claims, 8 Drawing Sheets

(51) Int. Cl.
  G06F 9/451      (2018.01)
  G06F 3/0346     (2013.01)
  G06F 3/14       (2006.01)
  G06F 3/01       (2006.01)
  G06F 3/0354     (2013.01)
(52) U.S. Cl.
  CPC .............. *G06F 9/451* (2018.02); *G06F 3/012* (2013.01); *G06F 3/0346* (2013.01); *G06F 3/03543* (2013.01)
(58) Field of Classification Search
  CPC ............... G06F 3/03543; G06F 3/0487; G06F 3/04815; G06F 9/451
  See application file for complete search history.

(56) References Cited

U.S. PATENT DOCUMENTS

| | | | | |
|---|---|---|---|---|
| 2016/0027214 | A1* | 1/2016 | Memmott | G02B 27/017 345/633 |
| 2016/0313790 | A1* | 10/2016 | Clement | G02B 27/0093 |
| 2018/0024633 | A1* | 1/2018 | Lo | G06F 3/1423 345/156 |
| 2018/0322681 | A1* | 11/2018 | Inomata | A63F 13/211 |
| 2019/0332189 | A1* | 10/2019 | Mandel-Iaia | G09G 3/001 |
| 2021/0072821 | A1* | 3/2021 | von und zu Liechtenstein | G06F 3/012 |

OTHER PUBLICATIONS

Benko et al., "Cross-Dimensional Gestural Interaction Techniques for Hybrid Immersive Environments", In IEEE Proceedings, Virtual Reality, 2005, pp. 209-216.

Berkman et al., "Presence and Immersion in Virtual Reality", In Encyclopedia of Computer Graphics and Games, Springer International Publishing, https://doi.org/10.1007/978-3-319-08234-9_162-1, 2018, pp. 1-10.

Bogdan et al., "HybridSpace: Integrating 3D Freehand Input and Stereo Viewing into Traditional Desktop Applications", In 2014 IEEE Symposium on 3D User Interfaces (3DUI), https://doi.org/10.1109/3dui.2014.6798842, Mar. 29-30, 2014, pp. 51-58.

Bozgeyikli et al., "Point & Teleport Locomotion Technique for Virtual Reality", In Proceedings of the 2016 Annual Symposium on Computer-Human Interaction in Play, ACM, https://doi.org/10.1145/2967934.2968105, Oct. 16-19, 2016, pp. 205-216.

Brudy et al., "Cross-Device Taxonomy:Survey, Opportunities and Challenges of Interactions Spanning Across Multiple Devices", In Proceedings of the 2019 CHI Conference on Human Factors in Computing Systems—CHI '19, ACM Press, https://doi.org/10.1145/3290605.3300792, 2019, pp. 1-28.

Buxton, Bill, "Multi-Touch Systems that I Have Known and Loved", Retrieved from http://www.billbuxton.com/multitouchOverview.html, on Sep. 1, 2021, Aug. 2020, 21 pages.

Carvalho et al., "Toward the design of transitional interfaces: an exploratory study on a semi-immersive hybrid user Interface", Virtual Reality, vol. 16, No. 4, https://doi.org/10.1007/s10055-011-0205-y, Dec. 2011, pp. 271-288.

Chen et al., "Assessing the use of immersive virtual reality, mouse and touchscreen in pointing and dragging-and-dropping tasks among young, middle-aged and older adults", Applied Ergonomics, vol. 65, https://doi.org/10.1016/j.apergo.2017.03.013, Nov. 2017, pp. 437-448.

Cheng et al., "Sparse Haptic Proxy: Touch Feedback in Virtual Environments Using a General Passive Prop", In Proceedings of the 2017 CHI Conference on Human Factors in Computing Systems, ACM, https://doi.org/10.1145/3025453.3025753, May 6-11, 2017, pp. 3718-3728.

Coninx et al., "A Hybrid 2D / 3D User Interface for Immersive Object Modeling", In Proceedings Computer Graphics International, IEEE Comput. Soc. Press, https://doi.org/10.1109/cgi.1997.601270, 1997, pp. 47-55.

Fender et al., "SpaceState: Ad-Hoc Definition and Recognition of Hierarchical Room States for Smart Environments", In Proceedings of the 2019 ACM International Conference on Interactive Surfaces and Spaces ISS '19, Association for Computing Machinery, https://doi.org/10.1145/3343055.3359715, Nov. 10-13, 2019, pp. 303-314.

Grubert et al., "MultiFi: Multi-Fidelity Interaction with Displays on and Around the Body", In Proceedings of the 33rd Annual ACM Conference on Human Factors in Computing Systems—CHI '15, ACM Press, https://doi.org/10.1145/2702123.2702331, Apr. 18-23, 2015, pp. 3933-3942.

Grubert et al., "Text Entry in Immersive Head-Mounted Display-Based Virtual Reality Using Standard Keyboards", In 2018 IEEE Conference on Virtual Reality and 3D User Interfaces (VR), IEEE, https://doi.org/10.1109/vr.2018.8446059, Mar. 18-22, 2018, pp. 159-166.

Hartmann et al., "RealityCheck: Blending Virtual Environments with Situated Physical Reality", In Proceedings of the 2019 CHI Conference on Human Factors in Computing Systems—CHI '19, ACM Press, https://doi.org/10.1145/3290605.3300577, May 4-9, 2019, pp. 1-12.

Kazi et al., "Kitty: Sketching Dynamic and Interactive Illustrations", In Proceedings of the 27th annual ACM symposium on User interface software and technology—UIST '14, ACM Press, https://doi.org/10.1145/2642918.2647375, Oct. 6-8, 2014, pp. 395-405.

Knibbe et al., "The Dream is Collapsing: The Experience of Exiting VR", In Proceedings of the 2018 CHI Conference on Human Factors in Computing Systems—CHI '18, ACM Press, https://doi.org/10.1145/3173574.3174057, Apr. 21-26, 2018, pp. 1-13.

Kosmalla et al., "Exploring Rock Climbing in Mixed Reality Environments", In Proceedings of the 2017 CHI Conference Extended Abstracts on Human Factors in Computing Systems—CHI EA '17, ACM Press, https://doi.org/10.1145/3027063.3053110, May 6-11, 2017, pp. 1787-1793.

Lee et al., "Immersive authoring of Tangible Augmented Reality content: A user study", Journal of Visual Languages & Computing, vol. 20, No. 2, 2009, pp. 61-79.

Dwyer et al., "Ilmmersive Analytics: An Introduction", Springer, vol. 11190, https://doi.org/10.1007/978-3-030-01388-2_1, 2018, pp. 1-23.

McGill et al., "A Dose of Reality:Overcoming Usability Challenges in VR Head-Mounted Displays", In Proceedings of the 33rd Annual ACM Conference Extended Abstracts on Human Factors in Computing Systems—CHI Ea '15, ACM Press, https://doi.org/10.1145/2702613.2732491, Apr. 18-23, 2015, p. 177.

Milgram et al., "Augmented reality: a class of displays on the reality-virtuality continuum", In Telemanipulator and Telepresence Technologies, Hari Das (Ed.), SPIE, https://doi.org/10.1117/12.197321, vol. 2351, 1994, pp. 282-292.

Millette et al., "DualCAD: Integrating Augmented Reality with a Desktop GUI and Smartphone Interaction", In 2016 IEEE International Symposium on Mixed and Augmented Reality (ISMAR—Adjunct), IEEE, DOI 10.1109/ISMAR-Adjunct.2016.23, 2016, pp. 21-26.

Pham et al., "HawKEY: Efficient and Versatile Text Entry for Virtual Reality", In 25th ACM Symposium on Virtual Reality Software and Technology, VRST '19, Association for Computing Machinery, Article 21, https://doi.org/10.1145/3359996.3364265, Nov. 2019, 10 pages.

Poupyrev et al., "The Go-Go Interaction Technique:Non-linear Mapping for Direct Manipulation in VR", In Proceedings of the 9th annual ACM symposium on User interface software and technology—UIST '96, ACM Press, https://doi.org/10.1145/237091.237102, 1996, pp. 79-80.

Samad et al., "Pseudo-HapticWeight: Changing the Perceived Weight of Virtual Objects by Manipulating Control- Display Ratio", In Proceedings of the 2019 CHI Conference on Human Factors in Computing Systems—CHI '19, ACM Press, https://doi.org/10.1145/3290605.3300550, May 4-9, 2019, pp. 1-13.

Santos et al., "Head-mounted display versus desktop for 3D navigation in virtual reality: a user study", Multimedia Tools and Applications, vol. 41, No. 1, https://doi.org/10.1007/s11042-008-0223-2, Aug. 2008, pp. 161-181.

(56) References Cited

OTHER PUBLICATIONS

Seraano et al., "Gluey: Developing a Head-Worn Display Interface to Unify the Interaction Experience in Distributed Display Environments", In Proceedings of the 17th International Conference on Human-Computer Interaction with Mobile Devices and Services—MobileHCI '15, ACM Press, https://doi.org/10.1145/2785830.2785838, Aug. 24-27, 2015, pp. 161-171.

Shewaga eta l., "A Comparison of Seated and Room-Scale Virtual Reality in a Serious Game for Epidural Preparation", IEEE Transactions on Emerging Topics in Computing, vol. 14, No. 8, https://doi.org/10.1109/tetc.2017.2746085, Aug. 2015, pp. 218-232.

Stoakley et al., "Virtual Reality on a WIM:Interactive Worlds in Miniature", In Proceedings of the SIGCHI conference on Human factors in computing systems—CHI '95, ACM Press, https://doi.org/10.1145/223904.223938, May 7-11, 1995, pp. 265-272.

Surale et al., "TabletinVR: Exploring the Design Space for Using a Multi-Touch Tablet in Virtual Reality", In Proceedings of the 2019 CHI Conference on Human Factors in Computing Systems, https://doi.org/10.1145/3290605.3300243, May 4-9, 2019, pp. 1-13.

Tsang et al., "Boom Chameleon: Simultaneous capture of 3D viewpoint, voice and gesture annotations on a spatially-aware display", In ACM SIGGRAPH 2003 Papers on—SIGGRAPH '03, ACM Press, https://doi.org/10.1145/1201775.882329, 2003, pp. 698.

Usoh et al., "Walking > Walking-in-Place > Flying, in Virtual Environments", In Proceedings of the 26th annual conference on Computer graphics and interactive techniques, SIGGRAPH 99,, 1999, pp. 359-364.

Vogel et al., "Interactive Public Ambient Displays: Transitioning from Implicit to Explicit, Public to Personal, Interaction with Multiple Users", In Proceedings of the 17th annual ACM symposium on User interface software and technology, Oct. 24-27, 2004, pp. 137-146.

Wentzel et al., "Improving Virtual Reality Ergonomics Through Reach-Bounded Non-Linear Input Amplification", In Proceedings of the 2020 CHI Conference on Human Factors in Computing Systems, DOI: https://dx.doi.org/10.1145/3313831.3376687, Apr. 25-30, 2020, pp. 1-12.

Zhu et al., "BISHARE: Exploring Bidirectional Interactions Between Smartphones and Head-Mounted Augmented Reality", In Proceedings of the 2020 CHI Conference on Human Factors in Computing Systems, https://doi.org/10.1145/3313831.3376233, Apr. 25-30, 2020, pp. 1-14.

Zielasko et al., "Menus on the Desk? System Control in DeskVR", In 2019 IEEE Conference on Virtual Reality and 3D User Interfaces (VR), IEEE, https://doi.org/10.1109/vr.2019.8797900, 2019, pp. 1287-1288.

Zielasko et al., "Remain Seated: Towards Fully-Immersive Desktop VR", In 2017 IEEE 3rd Workshop on Everyday Virtual Reality (WEVR), IEEE, https://doi.org/10.1109/wevr.2017.7957707, 2017, 6 pages.

* cited by examiner

| Transition | Transition Response | Toggle ON |
|---|---|---|
| Transition_1: State1 to State2 | Transition Response_1 | Y |
| Transition_2: State1 to State3 | Transition Response_2 | Y |
| Transition_3: State1 to State4 | Transition Response_3 | N |
| Transition_4: State2 to State1 | Transition Response_4 | Y |
| ... | | |

Figure 5

TRANSITIONS BETWEEN STATES IN A HYBRID VIRTUAL REALITY DESKTOP COMPUTING ENVIRONMENT

CROSS-REFERENCE TO RELATED APPLICATIONS

The present application claims the benefit of U.S. Provisional Application titled, "INTERFACE DESIGN FOR TRANSITIONING BETWEEN STATES IN VIRTUAL REALITY AND TRADITIONAL DESKTOP ENVIRONMENTS," filed on Sep. 2, 2020, and having Ser. No. 63/073,899. This related application, including any appendices or attachments thereof, is hereby incorporated by reference in its entirety.

BACKGROUND

Field of the Various Embodiments

The various embodiments relate generally to computer science and, more specifically, to transitions between states in a hybrid virtual reality—desktop computing environment.

DESCRIPTION OF THE RELATED ART

Performing computer-based workflows and tasks via virtual reality (VR) interfaces is becoming increasingly popular due to the distinct advantages provided by VR interfaces. For example, when performing a workflow within a three-dimensional (3D) design application, such as designing and/or prototyping a 3D virtual environment, a VR interface provides the user an immersive experience that allows a better sense of space and scale relative to a traditional desktop (TD) interface. However, performing workflows and tasks via a VR interface has disadvantages relative to a TD interface. For example, a TD mouse typically has a higher level of precision and accuracy than a VR controller and is less fatiguing to users over extended periods of time. Similarly, a TD monitor typically has a higher level of resolution than a VR headset and also is less fatiguing to user over extended periods of time. As another example, inputting text and performing repetitive operations is easier via a TD keyboard than a typical VR controller.

Given the different advantages of VR interfaces and TD interfaces, having access to both a VR interface and a TD interface when performing computer-based workflows or tasks is advantageous because either the VR interface or the TD interface, as the case may be, can be implemented by a user depending on which interface is best-suited for a given workflow or task being performed. For example, when designing a 3D virtual environment, the user can implement the TD interface to search for, select, and configure parameters for a given object within the 3D virtual environment. The user can then transition to the VR interface for placing that object at a particular location within the 3D virtual environment. The user can then transition back to the TD interface when reconfiguring parameters for the object and so forth.

One drawback to conventional systems, though, is that transitioning between a VR interface and a TD interface is oftentimes inefficient, disruptive, and cumbersome for a user. For example, a user may be required to perform multiple actions, such as changing devices and/or changing physical locations, in order to transition from one interface (for example, a VR interface) to the other interface (for example, a TD interface). Further, if the user fails to perform any of the required actions, then the interface to which the user is transitioning may not be immediately available to the user. The inability of conventional systems to provide smooth transitions between the VR interfaces and TD interfaces can substantially decrease the efficiency with which users can perform workflows and tasks and can substantially decrease the overall user-experience.

As the foregoing illustrates, what is needed in the art are more effective techniques for transitioning between VR interfaces and TD interfaces in computing environments.

SUMMARY

Various embodiments include a computer-implemented method for transitioning between states of a hybrid workstation. The computer-implemented method includes determining a first state of the hybrid workstation, wherein the hybrid workstation is associated with a plurality of states, each state is defined by at least a first parameter that specifies a first interface for interacting with the hybrid workstation or a second interface for interacting with the hybrid workstation, the first interface comprises a two dimensional (2D) interface, and the second interface comprises a three dimensional (3D) interface. The computer-implemented method also includes in response to detecting that the first parameter has changed, determining a first transition from the first state to a second state of the hybrid workstation. The computer-implemented method further includes identifying a first transition response corresponding to the first transition, and executing the first transition response on at least one of the first interface or the second interface.

At least one technical advantage of the disclosed techniques relative to the prior art is that the disclosed techniques enable transitions between VR interfaces and TD interfaces in computing environments that are less disruptive and cumbersome for users. Among other things, the disclosed techniques determine and execute a particular transition response based on a detected transition (from the VR interface to the TD interface or from the TD interface to the VR interface). The transition response includes one or more operations that are performed on the VR interface and/or the TD interface that automatically effect a transition from one interface to the other without any required user action. In this manner, the disclosed techniques are able to improve the efficiency with which users perform workflows and tasks and improve the overall user-experience relative to prior art systems. These technical advantages represent one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, can be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

FIG. 5 is a more detailed illustration of the transition table of FIG. 1, according to various embodiments;

DETAILED DESCRIPTION

Figure 1:
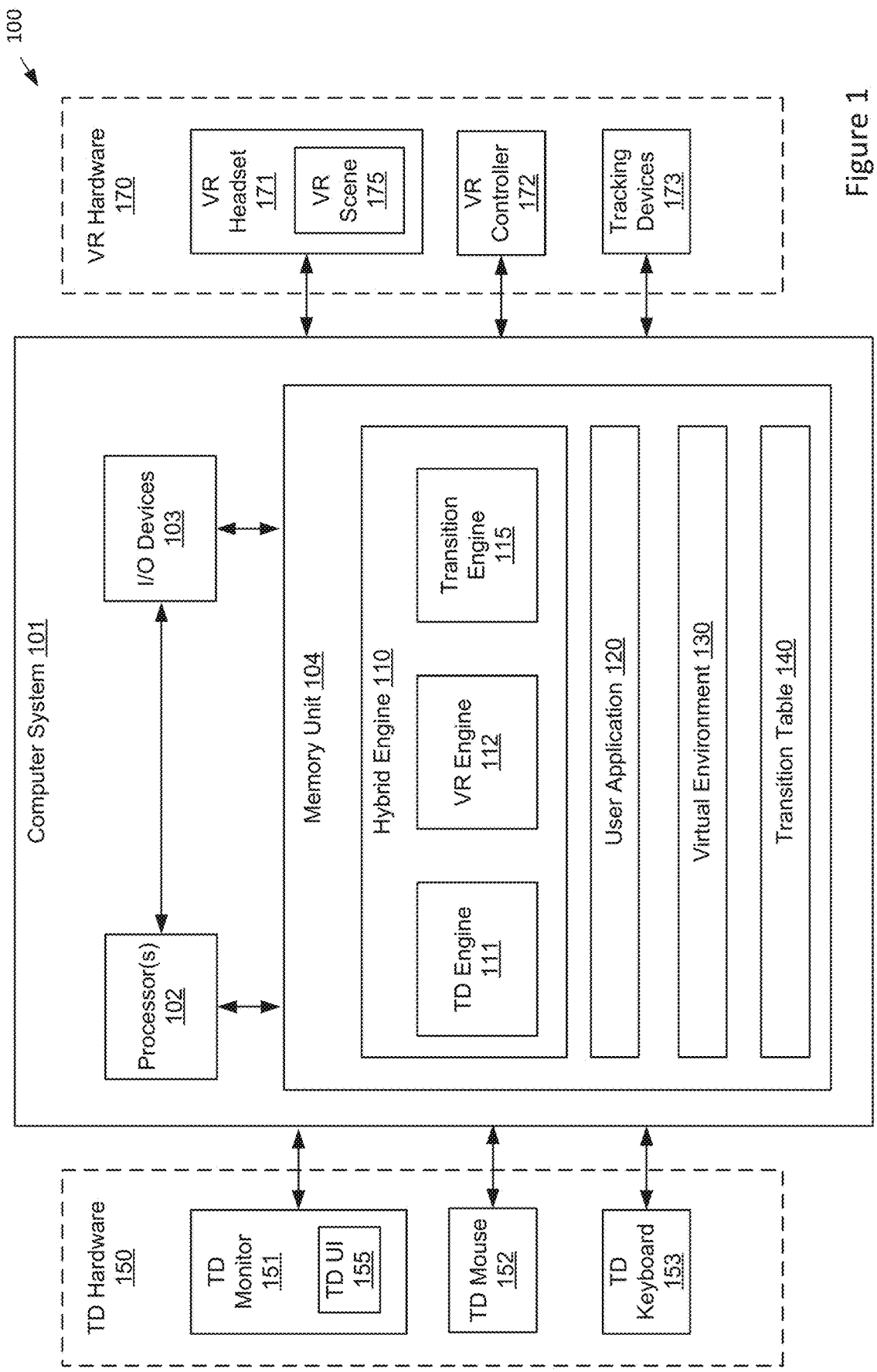
FIG. 1 illustrates a hybrid workstation configured to implement one or more aspects of the embodiments.

In the following description, numerous specific details are set forth to provide a more thorough understanding of the various embodiments. However, it will be apparent to one of skilled in the art that the inventive concepts can be practiced without one or more of these specific details.

As used herein, a "hybrid workstation" comprises a unified computing system that provides both a VR interface and a TD interface. The hybrid workstation enables switching (transitions) between the VR interface and the TD interface for continuing computer-based workflows and tasks. The hybrid workstation is also referred to as a hybrid interface or VR-enabled workstation.

As used herein, a "VR interface" can comprise VR-specific hardware and software components. VR hardware can include a VR headset, one or more VR controllers, and one or more tracking devices. VR software can include a VR application/engine that generates a VR scene that is displayed on the VR headset. The VR scene comprises a 3D representation of a virtual environment. The VR interface comprises a 3D-based interface for operating the hybrid workstation, whereby the VR headset and VR controller operate in 3D. When the VR interface is activated, the hybrid workstation is operating in VR mode.

As used herein, a "TD interface" can comprise TD-specific hardware and software components. TD hardware can include a TD monitor and one or more TD input devices (such as a TD mouse and/or TD keyboard). TD software can include a TD application/engine that generates a TD user interface (UI) that is displayed on the TD monitor. The TD UI can comprise a graphical user interface (GUI) that displays a two-dimensional (2D) representation of the virtual environment via a resizable window. The TD interface can comprise a 2D windows-based interface for operating the hybrid workstation, whereby the TD monitor and TD mouse operate in 2D. The TD interface comprises a non-VR interface. Although a TD interface includes a traditional desktop computing device, the TD interface can also include other traditional or conventional 2D-based computing devices, such as a laptop, a tablet, a mobile device, and the like. When the TD interface is activated, the hybrid workstation is operating in TD mode.

As used herein, a "room area" comprises a physical space/area (such as a room or office) that includes a desk, a desk area proximate to the desk, some or all components of the hybrid workstation, and a sufficient movement area beyond the desk area for the user to walk or move around to perform "room-scale" movements while in VR mode.

As used herein, a "virtual environment" comprises a simulated 3D environment that is common and accessible to both the VR interface and the TD interface. The virtual environment is rendered in the VR interface as a VR scene displayed on the VR headset. The VR scene provides a 3D rendering/representation of the virtual environment. The same virtual environment is also rendered in the TD interface as a TD UI displayed on the TD monitor. The TD UI provides a 2D rendering/representation of the virtual environment. The hybrid workstation enables the virtual environment to be accessed, created, or modified via the VR interface and/or the TD interface. The hybrid workstation also updates the virtual environment in the VR interface and the TD interface in real-time as modifications to the virtual environment are made. The virtual environment can include virtual components corresponding to one or more components of the VR interface and/or the TD interface.

As used herein, a "user application" comprises any 3D-based application, such as a 3D design application, 3D gaming application, and the like. The user can transition between the VR and TD interfaces when performing various computer-based workflows or tasks via the user application.

As used herein, a "state" of the hybrid workstation specifies a configuration of the hybrid workstation. A state of the hybrid workstation is defined by a combination of parameters including interface, position, and movement. The interface parameter specifies either the VR interface or the TD interface. The position parameter describes the pose of the user and specifies either the seated/sitting position or the standing position. The movement parameter describes the current movement of the user and specifies either stationary movement or room-scale movement. The hybrid workstation is associated with a plurality of different states, each state comprising a unique combination of values for the three parameters.

As used herein, a "transition" of the hybrid workstation comprises a change/switch from a current state of the hybrid workstation to a different next state of the hybrid workstation. A transition (change of state) of the hybrid workstation occurs whenever any value of the three parameters (interface, position, or movement) is changed. A plurality of unique transitions can occur in the hybrid workstation, each unique transition comprising a change from a particular current state to a particular next state. Therefore, each unique transition is defined by a unique combination of a current state and a next state.

As used herein, a "transition response" of the hybrid workstation comprises a response corresponding to a detected transition of the hybrid workstation. The transition response is selected from a plurality of transition responses based on the particular transition that is detected. The transition response comprises a set of operations that are performed on one or more components of the VR interface and/or the TD interface.

As disclosed herein, a hybrid workstation enables a VR interface, a TD interface, and transitions between the interfaces while performing various workflows and tasks in a user application. The state of the hybrid workstation is defined by three parameters comprising interface (VR interface or TD interface), position (seated or standing), and movement (stationary or room-scale). The hybrid workstation detects a transition (change) in the state of the hybrid workstation upon determining that any of the three parameters have changed. If so, the hybrid workstation has detected a transition from a current state to a next state of the hybrid workstation. The hybrid workstation then determines a transition response corresponding to the particular transition that is detected. The transition response comprises a set of operations that are performed on the VR interface and/or the TD interface that mitigate the disruption and inefficiency of the user when the detected transition occurs. In this manner, the disclosed techniques detect transitions in states occurring in the hybrid workstation and reduces the disruption and inefficiency caused by the transitions.

As disclosed herein, a first transition of the hybrid workstation occurs from a current state that includes the TD interface to a next state that includes the VR interface. A first transition response is determined based on the first transition. The first transition response includes configuring one or more TD input devices to interact and operate with the VR interface. As disclosed herein, a second transition of the hybrid workstation occurs from a current state that includes the VR interface to a next state that includes the TD interface. A second transition response is determined based on the second transition. The second transition response includes configuring the TD UI to enlarge the display of one or more UI elements in the TD UI.

As disclosed herein, a third transition of the hybrid workstation occurs from a current state that includes the VR interface and the stationary mode to a next state that includes the VR interface and the room-scale mode. A third transition response is determined based on the third transition. The third transition response includes changing the visual appearance of one or more virtual components in the VR scene based on the distance between the user and the physical items or components corresponding to the one or more virtual components. As disclosed herein, a fourth transition of the hybrid workstation occurs from a current state that includes the VR interface and the room-scale mode to a next state that includes the VR interface and the stationary mode. A fourth transition response is determined based on the fourth transition. The fourth transition response includes changing the visual appearance of one or more virtual components in the VR scene based on the distance between the user and the physical items or components corresponding to the one or more virtual components. The fourth transition response also includes configuring the VR controller to operate as a TD input device.

In other embodiments, additional transitions of the hybrid workstation are detected and additional transition responses are determined and executed based on the additional transitions.

System Overview

FIG. 1 illustrates a hybrid workstation 100 configured to implement one or more aspects of the embodiments. As shown, the hybrid workstation 100 includes, without limitation, a computer system 101 connected to various TD hardware 150 and various VR hardware 170. The computer system 101 may comprise at least one processor 102, input/output (I/O) devices 103, and a memory unit 104 coupled together. The computer system 101 may comprise a server, personal computer, laptop or tablet computer, mobile computer system, or any other device suitable for practicing various embodiments described herein.

In general, a processor 102 may be any technically feasible processing device or hardware unit capable of processing data and executing software applications and program code. The processor 102 executes the software and performs the functions and operations set forth in the embodiments described herein. For example, a processor 102 can comprise a central processing unit (CPU), a graphics processing unit (GPU), a digital signal processor (DSP), an application-specific integrated circuit (ASIC), a field programmable gate array (FPGA) or other programmable logic device, discrete gate or transistor logic, discrete hardware components, or any combination of different processing units, such as a CPU configured to operate in conjunction with a GPU.

The memory unit 104 can include a hard disk, a random access memory (RAM) module, a flash memory unit, or any other type of memory unit or combination thereof. Processor 102 and I/O devices read data from and write data to memory 104. The memory unit 104 stores software application(s) and data. Instructions from the software constructs within the memory unit 104 are executed by processors 102 to enable the inventive operations and functions described herein.

I/O devices 103 are also coupled to memory 104 and can include devices capable of receiving input as well as devices capable of providing output. The I/O devices 103 can include input and output devices not specifically listed in the TD hardware 150 and VR hardware 170, such as a network card for connecting with a network, a trackball, a speaker, a fabrication device (such as a 3D printer), and so forth. Additionally, I/O devices can include devices capable of both receiving input and providing output, such as a touchscreen, a universal serial bus (USB) port, and so forth.

The computer system 101 is connected to various TD hardware 150, including a TD monitor 151, TD mouse 152, and a TD keyboard 153. The TD monitor 151 can comprise a conventional/traditional flat 2D display that displays 2D images (such as the TD UI 155). The TD mouse 152 can comprise a conventional/traditional 2-Degree of Freedom input device that operates in 2D along a flat/horizontal surface, such as a desk.

The computer system 101 is also connected to various VR hardware 170, including a VR headset 171, a VR controller 172, and one or more tracking devices 173. The VR controller 172 comprises a VR-tracked device that is tracked by the tracking devices 173 that can determine height and location information for the VR controller 172. The VR controller 172 comprises a 6-Degree of Freedom (6DOF) controller that operates in 3D, which can be less precise and more tiring to operate than the TD mouse 152 which operates in 2D.

The VR headset 171 can display images in 3D stereo images (such as the VR scene 175). The VR headset 171 comprises a VR-tracked device that is tracked by the tracking devices 173 that can determine height and location information for the VR headset 171. The VR headset 171 includes a built-in proximity sensor (not shown) that detects when the VR headset 171 is placed over the head of the user and when the VR headset 171 is removed from the head of the user. Placing the VR headset 171 over the head of the user turns on (activates) the VR headset 171 and places the hybrid workstation 100 into VR mode. When VR mode is activated, the user is viewing the VR scene 175 through the VR headset 171. Therefore, when in VR mode, the user is interacting with the hybrid workstation 100 via the VR scene 175 and the VR headset 171. In contrast, removing the VR headset 171 from the head of the user turns off (de-activates) the VR headset 171 and places the hybrid workstation 100 into TD mode. When TD mode is activated, the user is viewing the TD UI 155 displayed on the TD monitor 151. Therefore, when in TD mode, the user is interacting with the hybrid workstation 100 via the TD monitor 151 and the TD UI 155. In these embodiments, the interface parameter is determined by whether the VR headset 171 is placed over the head of the user (whereby the interface parameter is equal to the VR interface) or the VR headset 171 is removed from the head of the user (whereby the interface parameter is equal to the TD interface).

The memory unit 104 stores a hybrid engine 110, a user application 120, a virtual environment 130, and a transition table 140. The hybrid engine 110 comprises a TD engine 111, a VR engine 112, and a transition engine 115. The user application 120 can comprise, for example, a 3D design application for creating, modifying, and interacting with the virtual environment 130. The 3D design application can provide various tools and functions for designing and modifying the virtual environment 130. In other embodiments, the user application 120 can comprise any other type of 3D-based application, such as a 3D video game, a 3D data analysis application, and the like. The virtual environment 130 can comprise a 3D virtual environment stored, for example, as data describing a current scene (such as the location, orientation, and details of virtual objects), data describing a user's position and orientation in the virtual environment, data pertinent to the rendering of the virtual scene (such as materials, lighting, and virtual camera location), and the like.

The TD engine 111 renders a 2D representation of the virtual environment 130 via a TD user interface (UI) 155 that includes various camera viewports into the virtual environment 130. The TD UI 155 can provide a conventional 2D windows-based representation of the virtual environment 130. The TD UI 155 is displayed on the TD monitor 151. The user can interact with the virtual environment 130 for performing workflows or tasks in the user application 120 via the TD UI 155 and TD hardware 150. For example, the user can navigate within the virtual environment 130 or create and modify scenes, animations, or virtual objects within the virtual environment 130 using the TD mouse 152 and the TD keyboard 153. Meanwhile, the TD UI 155 displayed on the TD monitor 151 provides visual feedback to the user to assist in performing the workflows or tasks within the virtual environment 130.

The VR engine 112 renders a VR scene 175 comprising a 3D representation of the virtual environment 130. The VR scene 175 is displayed on the VR headset 171. The user can interact with the virtual environment 130 for performing workflows or tasks in the user application 120 via the VR scene 175 and VR hardware 170. For example, the user can navigate within the virtual environment 130 or create and modify scenes, animations, or virtual objects within the virtual environment 130 using one or more VR controllers 172. Meanwhile, the VR scene 175 displayed on the VR headset 171 provides visual feedback to the user to assist in performing the workflows or tasks within the virtual environment 130.

The VR interface provides the user an immersive experience that allows a better sense of space and scale relative to the TD interface. However, the VR interface typically relies on lower pixel density displays, which can hinder the utility of the VR interface for productive use with smaller visual elements, as compared to the TD interface. Also, the VR controller 172 operates in 3D, which can become tiring after prolonged periods. In comparison, the TD input devices of the TD interface can allow for more accuracy and precision in performing certain tasks and is less fatiguing during extended use. Therefore, it is beneficial for a user to use both the VR and TD interfaces when performing workflow or tasks, and to switch between the interfaces depending on the current workflow or task.

In this regard, the hybrid workstation 100 comprises a single unified system that provides both TD and VR interfaces for interacting with a user application 120 and the virtual environment 130. In some embodiments, the TD interface comprises TD-specific hardware and software components, which includes the various TD hardware 150 and the TD engine 111. In some embodiments, the VR interface comprises VR-specific hardware and software components, which includes the various VR hardware 170 and the VR engine 112. The hybrid workstation 100 also includes a transition engine 115 that assists in the transitions between the different states of the hybrid workstation 100 (including transitions between the interfaces) for improving user efficiency and the overall user experience when interacting with the user application 120 and the virtual environment 130.

In general, the state of the hybrid workstation 100 is defined by three parameters comprising interface, position, and movement. The transition engine 115 detects a transition in the state of the hybrid workstation 100 upon determining that any of the three parameters have changed. If so, the transition engine 115 then determines a particular transition response based on the particular transition using the transition table 140. The transition table 140 can include a plurality of transition responses for a plurality of unique transitions, each transition response being mapped to a particular transition. Each transition response specified in the transition table 140 for a particular transition comprises a set of operations that are performed on one or more components of the VR interface and/or the TD interface that mitigate the disruption and inefficiency of the user when the particular transition occurs. Each transition response can be executed by the transition engine 115 on one or more software and/or hardware components of the VR interface and/or the TD interface.

For example, a transition response can be executed on the TD engine 111 to configure the TD engine 111 to display the TD UI 155 in a particular manner (such as increasing the size or scale of UI elements). As another example, a transition response can be executed on a TD input device (such as the TD mouse 152 and/or TD keyboard 153) to configure the TD input device to operate in a particular manner (such as operating in the VR interface rather than operating in the TD interface). As another example, a transition response can be executed on the VR engine 112 to configure the VR engine 112 to display the VR scene 175 in a particular manner (such as changing the opacity of one or more virtual components in the VR scene 175). As another example, a transition response can be executed on the VR controller 172 to configure the VR controller 172 to operate in a particular manner (such as simulating a 2D TD input device). In this manner, the transition engine 115 detect transitions in states occurring in the hybrid workstation 100 and reduces the disruption and inefficiency caused by the detected transitions.

Figure 2:
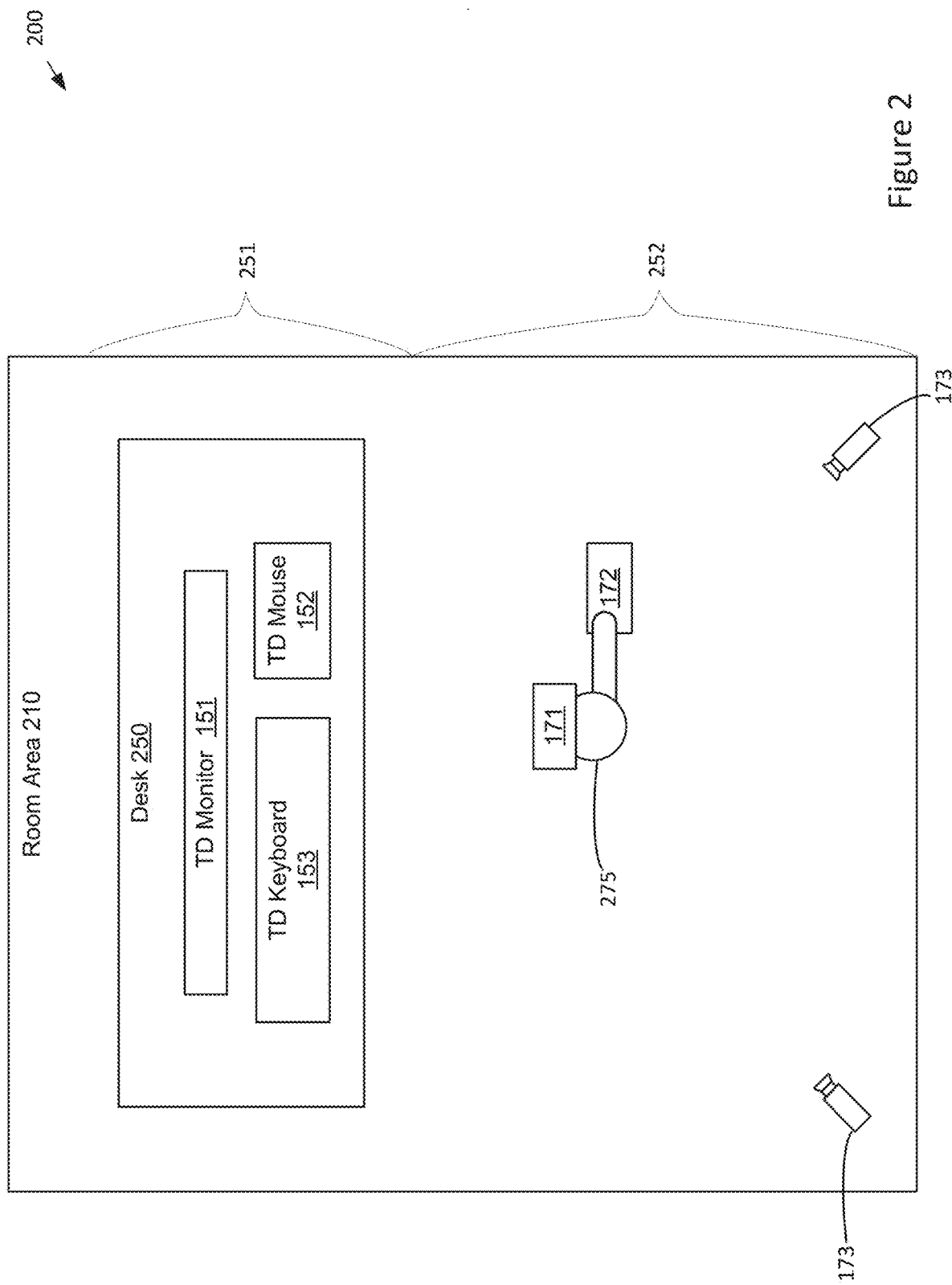
FIG. 2 illustrates an overhead view of a hybrid workstation environment in which the hybrid workstation of FIG. 1 can operate, according to various embodiments.

FIG. 2 illustrates an overhead view of a hybrid workstation environment 200 in which the hybrid workstation 100 of FIG. 1 can operate, according to various embodiments. As shown, the hybrid workstation environment 200 includes, without limitation, a room area 210. The room area 210 comprises a physical space/area (such as a room or office) that includes a physical desk 250, various TD hardware 150 (such as a TD monitor 151, TD mouse 152, and a TD keyboard 153), and various VR hardware 170 (such as a VR headset 171, VR controller 172, and one or more tracking devices 173). The various TD hardware 150 is typically placed in locations on the physical desk 250.

The room area 210 also includes a desk area 251 proximate to the desk 250, and a movement area 252 beyond the desk area 251 for the user to walk or move around to perform "room-scale" movements while in VR mode. The desk area 251 can be defined to be within a predetermined threshold distance from the desk 250 (such as 1 meter), whereby the movement area 252 can be defined to be outside the predetermined threshold distance from the desk 250 (such as beyond 1 meter). When the hybrid workstation 100 is operating in VR mode, the user 275 is viewing the VR scene 175 displayed on the VR headset 171 while interacting with the VR scene 175 via the VR controller 172. In VR mode, the user 275 can either be located in front of or near the desk 250 within the desk area 251 (which indicates the stationary mode) or move around within the movement area 252 (which indicates the room-scale mode) to explore and interact with the VR scene 175.

The tracking devices 173 can track the 3D position (including the location and height) of visible items and components within the room area 210, including the VR headset 171, the VR controller 172, the physical desk 250, the TD monitor 151, the TD mouse 152, and the TD keyboard 153. In general, the tracking devices 173 generate 3D space information (tracking data) for visible items and components within the room area 210 which can indicate the location, height, orientation, and shape of the visible items and components. Each tracking device 173 can include various components (not shown) for performing the above-described functions of the tracking device 173. For example, each tracking device 173 can include a spatial tracker receiver that communicates with a spatial capture camera, such as a Kinect 3D scanner. The spatial capture camera can generate 3D space information for the room area 210, and the spatial tracker receiver can communicate the 3D space information to the VR engine 112 and the transition engine 115. In some embodiments, the transition engine 115 receives the tracking data (3D space information) generated by the tracking devices 173 to perform the embodiments described herein.

Figure 3A:
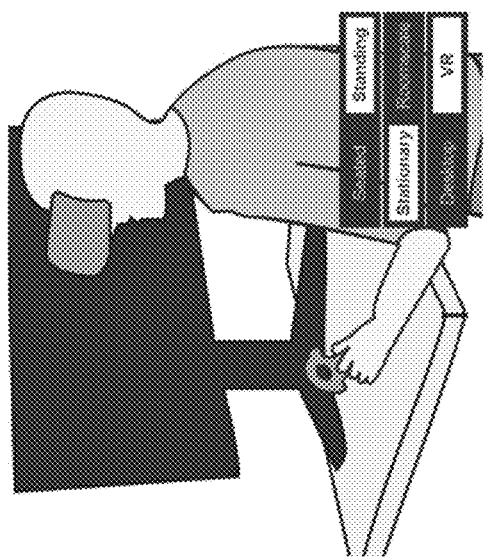
FIG. 3A illustrates a first state of the hybrid workstation of FIG. 1, according to various embodiments.
Figure 3B:
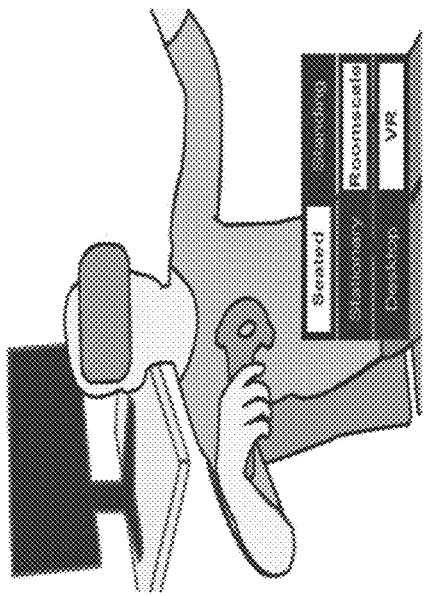
FIG. 3B illustrates a second state of the hybrid workstation of FIG. 1, according to various embodiments.
Figure 3C:
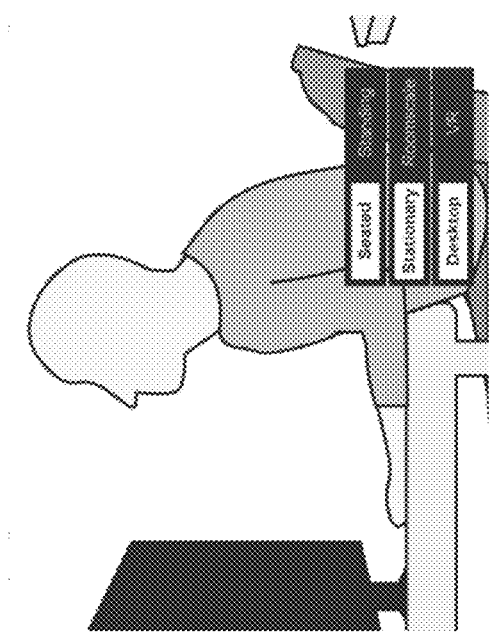
FIG. 3C illustrates a third state of the hybrid workstation of FIG. 1, according to various embodiments.
Figure 3D:
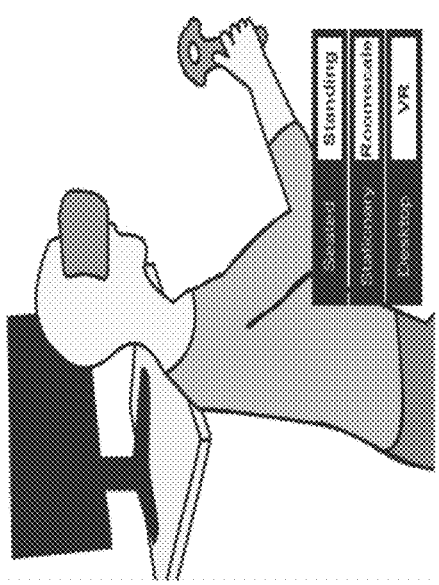
FIG. 3D illustrates a fourth state of the hybrid workstation of FIG. 1, according to various embodiments.

FIG. 3A-D illustrate four common states of the hybrid workstation 100. FIG. 3A illustrates a first state of the hybrid workstation 100 of FIG. 1, according to various embodiments. As shown, the first state is defined by a combination of values for three parameters, including the "TD interface" value for the interface parameter, the "seated" value for the position parameter, and "stationary" value for the movement parameter. FIG. 3B illustrates a second state of the hybrid workstation 100 of FIG. 1, according to various embodiments. As shown, the second state is defined by a combination of values for three parameters, including the "VR interface" value for the interface parameter, the "standing" value for the position parameter, and "stationary" value for the movement parameter. FIG. 3C illustrates a third state of the hybrid workstation 100 of FIG. 1, according to various embodiments. As shown, the third state is defined by a combination of values for three parameters, including the "VR interface" value for the interface parameter, the "standing" value for the position parameter, and "room-scale" value for the movement parameter. FIG. 3D illustrates a fourth state of the hybrid workstation 100 of FIG. 1, according to various embodiments. As shown, the fourth state is defined by a combination of values for three parameters, including the "VR interface" value for the interface parameter, the "seated" value for the position parameter, and "room-scale" value for the movement parameter. In VR mode, the seated position of the user while performing room-scale movements allows the user to explore the VR scene 175 by moving around the room area 210, while also being seated comfortably in a mobile chair.

Figure 4:
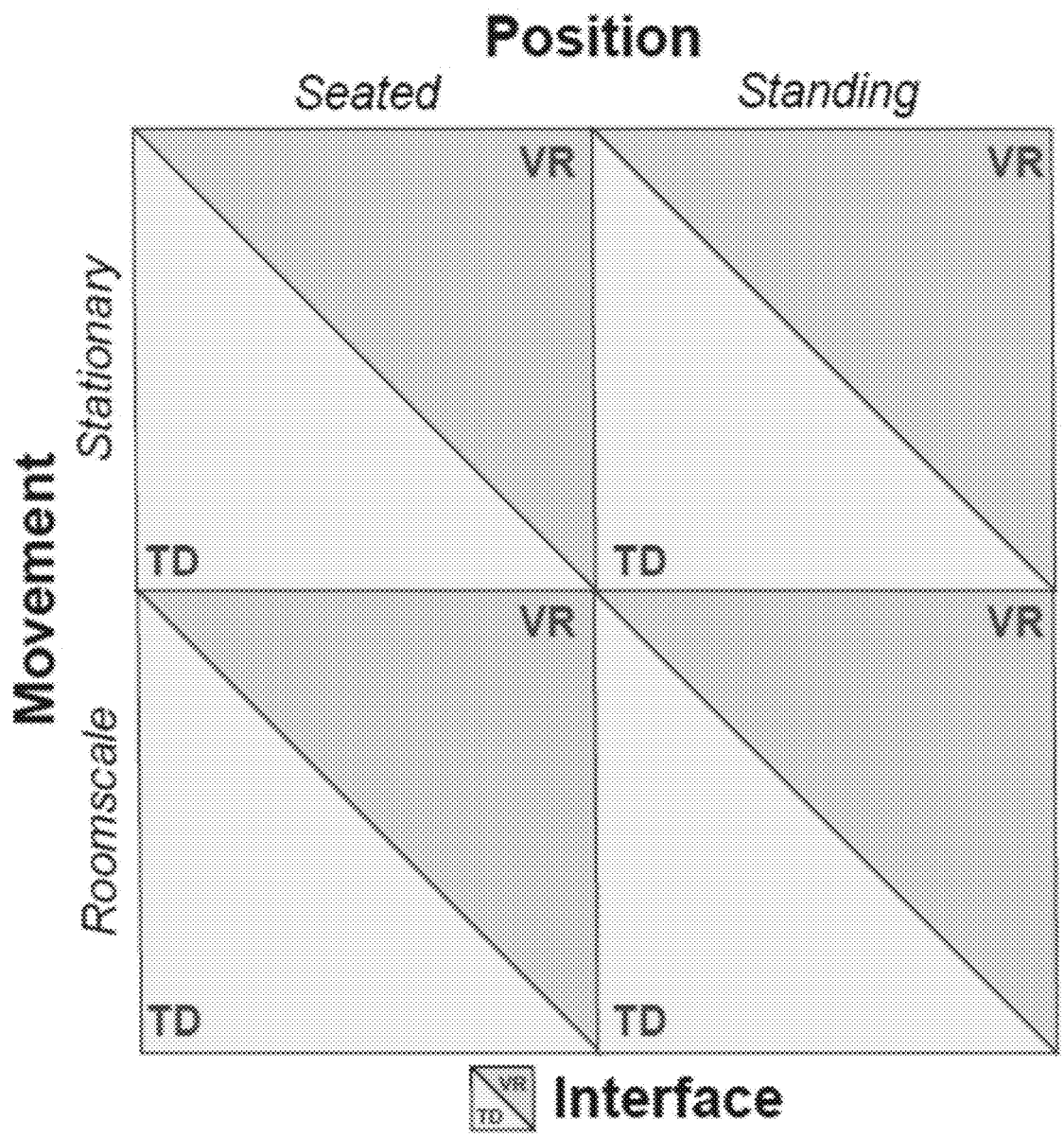
FIG. 4 illustrates conceptual diagram of the different states of the hybrid workstation of FIG. 1, according to various embodiments.

FIG. 4 illustrates conceptual diagram of the different states of the hybrid workstation of FIG. 1, according to various embodiments. The movement parameter indicates the movement of the user, which is either stationary or room-scale. The movement parameter indicates the relative amount of lateral movement of the user within the room area 210. In stationary mode, the lateral movement of the user is restricted to a small, predefined area (the desk area 251) around the desk 250. Therefore, in stationary mode, the user is typically in front of or near the desk 250. In room-scale mode, the lateral movement of the user is not restricted to the small desk area 251a round the desk 250. Therefore, in room-scale mode, the user is typically away from the desk 250 and is moving around the movement area 252 that is outside the desk area 251. While in VR mode, operating in room-scale mode provides a more immersive experience for the user since the user can walk around physically, with corresponding movements being shown in the VR scene 175. However, physical limitations of the size of the room area 210 may limit room-scale movements and not be feasible for all situations. Also, operating in stationary mode involves minimal physical movement and can be less tiring on the user.

A transition of the hybrid workstation 100 comprises a change/switch from a current state of the hybrid workstation 100 to a different next state of the hybrid workstation 100. A transition (change of state) of the hybrid workstation 100 occurs whenever any value of the three parameters (interface, position, or movement) is changed. Therefore, each state has 3 possible exit transitions, corresponding to a change in value for any of the 3 parameters. In some embodiments, the hybrid workstation 100 is associated with 24 possible unique transitions, each unique transition comprising a change from a particular current state to a particular next state. The transition engine 115 receives sensor and/or tracking data from the various VR hardware 170, such as the VR headset 171, VR controller 172, and the tracking devices 173 to determine if any of the three parameters have changed in a current state.

A change in the interface parameter can be inferred from sensor data received from the built-in proximity sensor of the VR headset 171. In particular, to determine a change in the interface parameter, the transition engine 115 monitors the sensor data from the built-in proximity sensor of the VR headset 171. When the VR headset 171 is placed over the head of the user, the proximity sensor of the VR headset 171 sends sensor data to the transition engine 115 that indicates the user is wearing the VR headset 171 and the VR headset 171 has been turned on (activated). In response to the VR headset 171 being activated, the transition engine 115 determines that the hybrid workstation 100 is operating in VR mode and the interface parameter is set to equal "VR interface." When the VR headset 171 is removed from the head of the user, the proximity sensor of the VR headset 171 sends sensor data to the transition engine 115 that indicates the user is not wearing the VR headset 171 and the VR headset 171 has been turned off (de-activated). In response to the VR headset 171 being de-activated, the transition engine 115 determines that the hybrid workstation 100 is operating in TD mode and the interface parameter is set to equal "TD interface." Therefore, whenever the user puts on or removes the VR headset 171, the transition engine 115 determines that a transition (change) of the current state of the hybrid workstation 100 has occurred due to a change in the interface parameter.

A change in the position parameter can be inferred from the tracking data for the VR headset 171 received from the tracking devices 173. In particular, to determine a change in the position parameter, the transition engine 115 monitors the height tracking data for the VR headset 171 received from the tracking devices 173. The seating or standing position of the user can be inferred by determining the height of the VR headset 171 from the floor by analyzing the received tracking data. The transition engine 115 can establish a threshold height value below which the transition engine 115 determines the user is in a seated/sitting position, and above which the transition engine 115 determines the user is in a standing position. The transition engine 115 can establish the threshold height value, for example, by tracking and inferring the user's typical standing and sitting heights or by using a pre-determined threshold height value. Therefore, whenever the received height tracking data for the VR headset 171 indicates that the height of the VR headset 171 falls below or climbs above the threshold height value, the transition engine 115 determines that a transition (change) of the current state of the hybrid workstation 100 has occurred due to a change in the position parameter.

A change in the movement parameter can be inferred from the tracking data for the VR headset 171 received from the tracking devices 173. In particular, to determine a change in the movement parameter, the transition engine 115 monitors the tracking data for the VR headset 171 received from the tracking devices 173. The stationary or room-scale movement of the user can be inferred by determining the proximity or distance of the VR headset 171 from the desk 250 by analyzing the received tracking data. A predetermined threshold distance between the VR headset 171 and the desk 250 can be established (such as 1 meter), below which the transition engine 115 determines that the user is in stationary mode, and above which the transition engine 115 determines that the user is in room-scale mode. In stationary mode, the lateral movement of the user is within the predetermined threshold distance around the desk 250 (is within the desk area 251). In room-scale mode, the lateral movement of the user is outside the predetermined threshold distance around the desk 250 (is outside the desk area 251) and the user is moving around the movement area 252. Therefore, whenever the received location tracking data for the VR headset 171 indicates that the distance of the VR headset 171 from the desk 250 falls below or climbs above the predetermined threshold distance, the transition engine 115 determines that a transition (change) of the current state of the hybrid workstation 100 has occurred due to a change in the movement parameter.

If the transition engine 115 detects a transition in the state of the hybrid workstation 100, in response, the transition engine 115 then determines a particular transition response corresponding to the particular transition using the transition table 140. FIG. 5 is a more detailed illustration of the transition table of FIG. 1, according to various embodiments. As shown, the transition table 140 comprises a plurality of entries 501 (such as 501a, 501b, 501c, etc.), each entry 501 corresponding to a unique transition. Each entry 501 comprises a plurality of data fields, including a transition field 510, a transition response field 520, and a toggle on field 530.

The transition field 510 specifies a unique transition from a particular current state to a particular next state. Note that each transition comprises a unique combination of a current state and a next state. As shown, the first transition (Transition_1) from a first state (state1) to a second state (state2) is different than the fourth transition (Transition_4) from the second state (state2) to the first state (state1). Therefore, the first transition can have a different corresponding transition response than the fourth transition. The transition response field 520 specifies a set of operations to be performed on the VR interface and/or the TD interface that reduces the disruption and inefficiency caused by corresponding transition. For example, if the fourth transition (Transition_4) is detected, the transition engine 115 determines that the fourth transition response (Transition Response_4) is to be performed, which reduces the disruption and inefficiency caused by the fourth transition (Transition_4). Therefore, the transition table 140 maps a transition response to each unique transition of the hybrid workstation 100.

In some embodiments, the user can configure the transition response for each transition to be turned on or off. If the transition response for a particular transition is toggled "off" by the user, the transition engine 115 will not execute the transition response corresponding to the particular transition when the particular transition is detected. If the transition response for a particular transition is toggled "on" by the user, the transition engine 115 will automatically execute the transition response corresponding to the particular transition whenever the particular transition is detected. In this manner, all transition responses for corresponding transitions that are toggled "on" by the user are automatically executed by the transition engine 115 whenever the corresponding transitions are detected by the transition engine 115, without requiring further intervention or interaction by the user.

Traditional Desktop User Interface and Virtual Reality Scene

As discussed above, a virtual environment comprises a simulated 3D environment that is common and accessible to both the VR interface and the TD interface. The virtual environment is rendered in the VR interface as a VR scene 175 displayed on the VR headset 171. The VR scene 175 provides a 3D rendering/representation of the virtual environment. The same virtual environment is also rendered in the TD interface as a TD UI 155 displayed on the TD monitor 151. The TD UI 155 provides a 2D rendering/representation of the virtual environment. The virtual environment can be created, interacted with, and modified via both the VR interface and the TD interface within the hybrid workstation 100. The hybrid workstation 100 also updates the virtual environment in the VR interface and the TD interface in real-time as modifications to the virtual environment are made so that the VR scene 175 and the TD UI 155 each reflect the current virtual environment.

The hybrid workstation 100 can also provide alignment between the real-world physical environment of the room area 210 and the virtual environment. In particular, the virtual environment can include virtual components representing and corresponding to the physical items and components within the room area 210, including the desk 250, and components of the VR interface and/or the TD interface. For example, the virtual environment can include a virtual desk corresponding to the desk 250, a virtual TD monitor corresponding to the TD monitor 151, a virtual TD mouse corresponding to the TD mouse 152, and a virtual TD keyboard corresponding to the TD keyboard 153. The virtual environment can further include a virtual VR controller corresponding to the VR controller 172 and a virtual VR headset corresponding to the VR headset 171.

The hybrid workstation 100 can provide alignment between components in the physical environment of the room area 210 and the virtual environment in terms of location. In this regard, the locations and orientations of the virtual components in the virtual environment align with and reflect the locations and orientations of the corresponding physical items and components within the physical room area 210. In this manner, the location of each virtual component is placed within the virtual environment to reflect the location of the corresponding physical item or component within the physical room area 210. Therefore, the VR scene 175 and the TD UI 155 can each display the virtual components in the virtual environment that align with the corresponding items and components within the physical room area 210 to give the user a better sense of context.

The hybrid workstation 100 can also provide alignment between the content displayed in the VR scene 175 and the TD UI 155. In this regard, the VR scene 175 displays the virtual TD monitor corresponding to the TD monitor 151, whereby the virtual TD monitor displays a virtual TD UI corresponding to the TD UI 155. In some embodiments, the VR scene 175 displays the virtual TD UI by displaying one or more UI elements currently being displayed in the TD UI 155 on the physical TD monitor 151. In these embodiments, while in VR mode, the user can interact with the virtual TD UI and the one or more UI elements displayed in the virtual TD UI via the VR scene 175. The user interactions with the virtual TD UI within the VR scene 175 can cause modifications to the virtual environment, such as modification of parameters for a selected object within the virtual environment. The user interactions with the virtual TD UI within the VR scene 175 are also mirrored and displayed to the TD UI 155 on the physical TD monitor 151.

Figure 6:
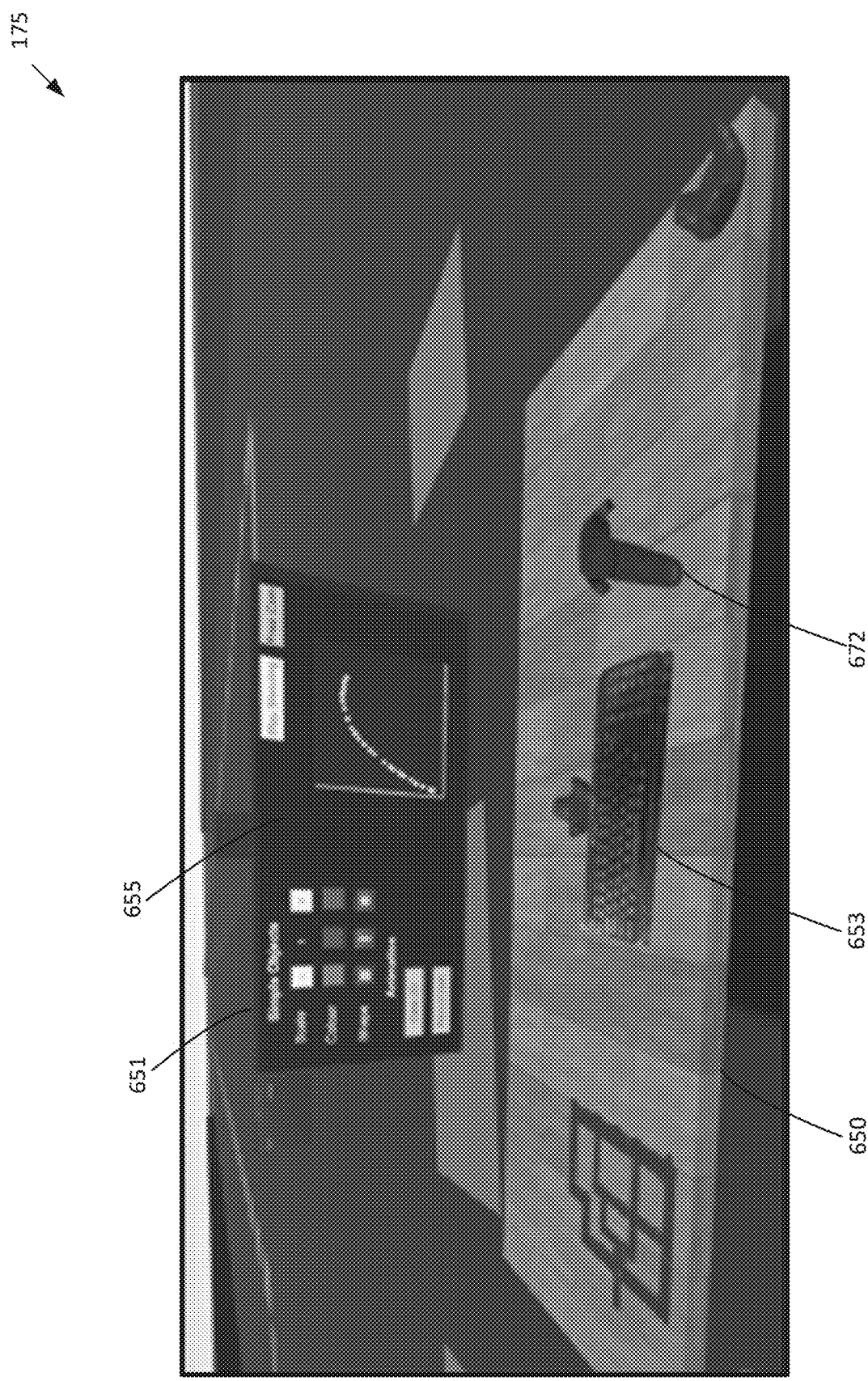
FIG. 6 is a screenshot of the VR scene of FIG. 1, according to various embodiments.

FIG. 6 is a screenshot of the VR scene of FIG. 1, according to various embodiments. As shown, the VR scene 175 displays virtual components corresponding to the physical items and components within the room area 210, including a virtual desk 650 corresponding to the desk 250, a virtual TD monitor 651 corresponding to the TD monitor 151, a virtual TD keyboard 653 corresponding to the TD keyboard 153, and a virtual VR controller 672 corresponding to the VR controller 172. The VR scene 175 can also display virtual components corresponding to any other physical items or components within the room area 210, such as a virtual TD mouse corresponding to the TD mouse 152 or a virtual VR headset corresponding to the VR headset 171.

The locations and orientations of the virtual components displayed in the VR scene 175 align with and reflect the locations and orientations of the corresponding physical items and components within the physical room area 210. The location and orientation alignment of the virtual components with the corresponding physical items and components help to keep the user perceptually grounded and oriented in the VR scene 175, and to mitigate the unpleasant feelings associated with exiting the VR scene 175. Also, the aligned locations and orientations of the virtual components can assist the user in finding the corresponding physical items and components within the room area 210 while in VR mode. For example, while the user is in VR mode and viewing the VR scene 175 via the VR headset 171, the aligned virtual desk 650 can assist the user in moving to find the physical desk 250 within the room area 210.

The content between the VR scene 175 and the TD UI 155 is also aligned. In this regard, the virtual TD monitor 651 within the VR scene 175 displays a virtual TD UI 655 corresponding to the TD UI 155. The virtual TD UI 655 can display one or more UI elements currently being displayed in the TD UI 155 on the physical TD monitor 151. The user can interact with the virtual TD UI 655 and the one or more UI elements displayed in the virtual TD UI 655 while within the VR scene 175.

Figure 7:
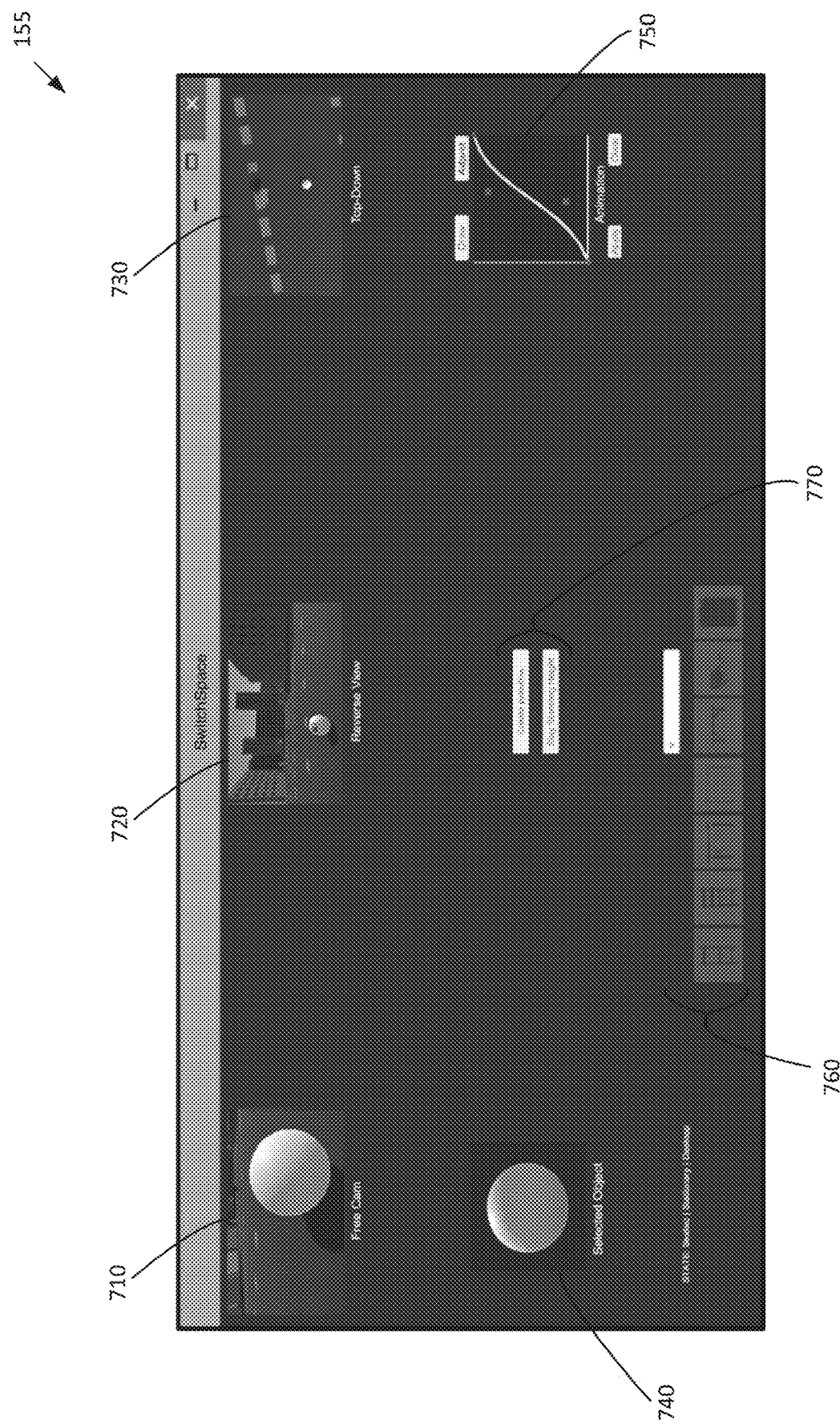
FIG. 7 is a screenshot of the TD user interface (UI) of FIG. 1, according to various embodiments.

The TD UI 155 provides a 2D rendering/representation of the virtual environment. The TD UI 155 can provide a conventional windows-based representation of the virtual environment. FIG. 7 is a screenshot of the TD user interface (UI) of FIG. 1, according to various embodiments. As shown, the TD UI 155 displays a plurality of UI elements 710, 720, 730, 740, 750, 760, and 770.

The TD UI 155 displays various 2D camera viewports/windows into the virtual environment 130, including a first viewport 710, a second viewport 720, and a third viewport 730. Each camera viewport displays a view of a particular virtual camera placed within the virtual environment 130. In some embodiments, the first viewport 710 corresponds to a virtual camera placed freely by the user from within the virtual environment, such as via the VR scene 175 while in VR mode. The second viewport 720 can correspond to a virtual camera placed on the virtual desk 650 and pointed towards the center of the virtual environment. The third viewport 730 can correspond to a virtual camera placed above the virtual desk 650 at a predetermined height (such as 5 meters) and pointed downwards towards the virtual desk 650. In other embodiments, the TD UI 155 displays a different number of camera viewports and/or displays camera viewports corresponding to virtual cameras placed at other locations within the virtual environment 130. The user can interact with the virtual environment 130 for performing workflows or tasks in the user application 120 via the TD UI 155. For example, the user can interact with each of the various camera viewports 710, 720, and 730 to select and manipulate objects from the perspective of the virtual camera corresponding to the camera viewport.

The TD UI 155 can also display various tools and widgets for enabling particular functions, including an object tool 740, animation tool 750, a search tool 760, and one or more toggle buttons 770. The object tool 740 can provide functionality for the user to configure and adjust parameters for creating and modifying a selected object within the virtual environment 130. The animation tool 750 can provide functionality for the user to configure and adjust parameters for creating and modifying an animation within the virtual environment 130. The search tool 760 can provide functionality for the user to search for and select new objects for creating and modifying within the virtual environment 130. Note that the object tool 740, animation tool 750, and the search tool 760 can comprise user-application specific tools that are easier to user via the TD UI 155, relative to the VR scene 175, due to the use of the high-precision TD mouse 152 and the TD keyboard 153. The one or more toggle buttons 770 can provide functionality for the user to toggle one or more transition responses on or off, as discussed above in relation to FIG. 5. Any transition response for a corresponding transition that is toggled "on" by the user is automatically executed by the transition engine 115 whenever the corresponding transition is detected by the transition engine 115, without requiring further intervention or interaction by the user.

Transitions Between Different States and Transition Responses

As discussed above in relation to FIG. 5, if the transition engine 115 detects a transition in the state of the hybrid workstation 100 (upon determining that any of the three parameters have changed), the transition engine 115 then determines a particular transition response corresponding to the particular transition using the transition table 140.

In some embodiments, a first transition comprises a transition from a current state that includes the TD interface to a next state that includes the VR interface. In these embodiments, the current state specifies the interface parameter as the TD interface, the position parameter as either seated or standing, and the movement parameter as stationary. The next state specifies the interface parameter as the VR interface, the position parameter as either seated or standing, and the movement parameter as stationary. Therefore, the interface parameter has changed from the TD interface in the current state to the VR interface in the next state.

The transition engine 115 then determines a first transition response corresponding to the first transition using the transition table 140. The first transition response specifies a set of operations to be automatically performed by the transition engine 115 on an TD input device to configure the TD input device to operate in a particular manner when the first transition is detected that reduces the disruption and inefficiency caused by first transition. In particular, the first transition response specifies that one or more TD input devices (such as the TD mouse 152 and/or the TD keyboard 153) are to be reconfigured to be used with the VR interface (reconfigured to provide inputs to the VR interface). Optionally, the first transition response also specifies that the one or more TD input devices are to be reconfigured to not be used with the TD interface (reconfigured to not provide inputs to the TD interface).

To illustrate, in the current state, the hybrid workstation 100 is in TD mode (the VR headset 171 is not activated) and the user is seated or standing in stationary mode (the user is within the desk area 251). In the current state, the user is using the TD mouse 152 and/or the TD keyboard 153 to interact with and provide inputs to the TD UI 155. The user then places the VR headset 171 over the user's head, which activates the VR headset 171 and places the hybrid workstation 100 in VR mode. In the next state, the user is viewing the VR scene 175 through the VR headset 171, and is no longer viewing the TD UI 155. At this point, the transition engine 115 detects that the first transition has occurred, and identifies the first transition response from the transition table 140. The transition engine 115 then executes the first transition response to reconfigure the TD mouse 152 and/or the TD keyboard 153 for use with the VR interface. In particular, transition engine 115 reconfigures the TD mouse 152 and/or the TD keyboard 153 to provide inputs to the VR scene 175 of the VR interface. Therefore, the user can remain using the TD mouse 152 and/or the TD keyboard 153 to interact with the VR scene 175, without requiring the user to immediately switch to the VR controller 172.

While in VR mode, when the transition engine 115 detects any input signals received from the TD mouse 152 and/or the TD keyboard 153, the transition engine 115 maps the input signals to the VR scene 175 to perform various functions within the VR scene 175, such as selecting, configuring, and moving objects within the VR scene 175. The transition engine 115 can map the input signals received from the TD mouse 152 to generate a mouse-controlled cursor and mouse-click inputs within the VR scene 175, for example, to select and position objects in the VR scene 175 using the mouse-controlled cursor, and configure objects in the VR scene 175 using the mouse-click inputs. The transition engine 115 also maps the input signals received from the TD keyboard 153 to generate keyboard inputs within the VR scene 175, for example, to position objects within the VR scene 175 using the keyboard inputs (via the arrow keys that provide precise placement of objects), and configure objects in the VR scene 175 using the keyboard inputs. In addition, the VR scene 175 can display virtual components corresponding to the TD mouse 152 and the TD keyboard 153 that can visually guide the user to the physical locations of the TD mouse 152 and the TD keyboard on the desk 250.

While in VR mode, the user also has the option to switch to the VR controller 172 to interact with the VR scene 175. In some embodiments, when the transition engine 115 detects that input signals received from the VR controller 172 (indicating that the user has switched to the VR controller 172), the transition engine 115 reconfigures the TD mouse 152 and the TD keyboard 153 to operate with the TD interface and no longer operate with the VR interface (reconfigures the TD mouse 152 and the TD keyboard 153 to provide inputs to the TD UI 155 and no longer provide inputs to the VR scene 175). In other embodiments, after the user has switched to the VR controller 172, the user can continue to use the TD mouse 152 and/or the TD keyboard 153 to interact with the VR scene 175. In these embodiments, the user can switch back and forth from using the VR controller 172 to using the TD mouse 152 and/or the TD keyboard 153 to interact with the VR scene 175.

Optionally, the first transition response also specifies that the one or more TD input devices are also to be reconfigured to not be used with the TD interface (reconfigured to not provide inputs to the TD interface). In these embodiments, the transition engine 115 reconfigures the TD mouse 152 and/or the TD keyboard 153 to not provide inputs to the TD UI 155. While in VR mode, when the transition engine 115 detects any input signals received from the TD mouse 152 and/or the TD keyboard 153, the transition engine 115 does not map the input signals to the TD UI 155. Since the user is viewing the VR scene 175 and is not viewing the TD UI 155, the first transition response can prevent the user from inadvertently providing inputs to the TD UI 155 while using the TD mouse 152 and/or the TD keyboard 153 in VR mode.

Optionally, the first transition response also specifies that any objects selected in the current state within the TD UI 155 while in TD mode are to be displayed to appear behind or otherwise proximate to the virtual desk 650 within the VR scene 175. In this manner, the user can preview and inspect the selected objects more thoroughly immediately after switching to the VR mode in the next state.

As described above, the first transition response automatically allows the user to continue using the TD mouse 152 and/or the TD keyboard 153 after switching from TD mode to VR mode to interact with the VR scene 175. Therefore, the first transition response does not require the user to immediately perform a device switch to the VR controller 172 to facilitate the first transition. In this manner, the first transition response provides a more seamless transition from the TD mode to VR mode that reduces disruption of user's workflow and improves user efficiency.

In some embodiments, a second transition comprises a transition from a current state that includes the VR interface to a next state that includes the TD interface. In these embodiments, the current state specifies the interface parameter as the VR interface, the position parameter as either seated or standing, and the movement parameter as room-scale. The next state specifies the interface parameter as the TD interface, the position parameter as either seated or standing, and the movement parameter as room-scale. Therefore, the interface parameter has changed from VR interface in the current state to TD interface in the next state.

The transition engine 115 then determines a second transition response corresponding to the second transition using the transition table 140. The second transition response specifies a set of operations to be automatically performed by the transition engine 115 to configure the TD engine 111 to display the TD UI 155 in a particular manner when the second transition is detected that reduces the disruption and inefficiency caused by second transition. In particular, the second transition response specifies that one or more UI elements in the TD UI 155 are displayed to have a size or scale based on a distance of the user from the TD monitor 151 or desk 250. Examples of UI elements of the TD UI 155 include UI elements 710, 720, 730, 740, 750, 760, and 770 shown in FIG. 7.

To illustrate, in the current state, the hybrid workstation 100 is in VR mode (the VR headset 171 is activated) and the user is moving around the room area 210 in room-scale mode (the user is not within the desk area 251). The user then removes the VR headset 171 and the VR headset 171 is de-activated, which transitions the hybrid workstation 100 to the next state in TD mode. At this time point, when the state transitions to the next state in TD mode, the user may be a far distance (such as 5 meters) from the TD monitor 151 and the desk 250. Therefore, the TD UI 155 displayed on the TD monitor 151 is typically not immediately available and useful to the user, since the UI elements in the TD UI 155 are too small to be readable to the user at such a far distance. In the embodiments herein, when the transition engine 115 detects that the second transition has occurred, the transition engine 115 identifies the second transition response from the transition table 140. The transition engine 115 then executes the second transition response to reconfigure the TD UI 155 to display the one or more UI elements to have a size or scale based on a distance from the user to the TD monitor 151 or desk 250. In this manner, the one or more UI elements are displayed in the TD UI 155 to be larger than typically displayed, so that the TD UI 155 is immediately readable and useful to the user, even at a far distance.

In particular, the second transition response can specify that one or more UI elements in the TD UI 155 are to be displayed having a larger size or scale when the user is determined to be a greater distance from the TD monitor 151 or desk 250, and are to be displayed having a smaller size or scale when the user is determined to be a shorter distance from the TD monitor 151 or desk 250. For example, the second transition response can specify that a UI element in the TD UI 155 is to be displayed having a first size or scale when the user is determined to be a first distance from the TD monitor 151 or desk 250, and is to be displayed having a second size or scale when the user is determined to be a second distance from the TD monitor 151 or desk 250, wherein the first size or scale is greater than the second size or scale, and the first distance is greater than the second distance. In some embodiments, the relationship between the display size or scale of a UI element and the distance of the user from the TD monitor 151 or desk 250 can be expressed by a linear equation. In this manner, the transition engine 115 can configure the display size or scale of the one or more UI elements in the TD UI 155 to continually decrease in size or scale as the distance from the user to the TD monitor 151 or desk 250 continually decreases as the user moves closer to the TD monitor 151 or desk 250. Therefore, when the user moves to be close in proximity to the TD monitor 151 or desk 250 (for example, moves within the desk area 251), the one or more UI elements in the TD UI 155 will be displayed with the "normal" typical display size or scale.

As discussed above in relation to FIG. 2, the hybrid workstation 100 includes tracking devices 173 that track the 3D position of the various items and components within the room area 210, including the VR headset 171, the VR controller 172, the TD monitor 151, and the desk 250. In some embodiments, the position of the user within the room area 210 can be inferred from the location of the VR headset 171 or the VR controller 172 within the room area 210. In these embodiments, the user is assumed to be still carrying/holding the VR headset 171 and/or VR controller 172 when switching to TD mode and while moving towards the TD monitor 151 and the desk 250. Therefore, the distance between the user and the TD monitor 151 or desk 250 can be determined by determining the distance between the VR headset 171 or VR controller 172 and the TD monitor 151 or desk 250. The distance between the VR headset 171 or VR controller 172 and the TD monitor 151 or desk 250 can be determined by analyzing the tracking data generated by the tracking devices 173.

Optionally, the second transition response also specifies that one or more TD input devices are also to be reconfigured to be used with the TD interface (reconfigured to provide inputs to the TD UI 155) in the next state, if the TD input devices were previously configured to be used with the VR interface and not to be used with the TD interface in the current state. For example, the TD input devices may have been previously configured to be used with the VR interface and not to be used with the TD interface when the first transition is detected and the first transition response is performed, as discussed above.

As described above, the second transition response automatically makes adjustments to the UI elements in the TD UI 155 to be displayed larger than normal after switching from VR mode to TD mode while in room-scale mode. Therefore, the second transition response allows the user to immediately gather meaningful information from the TD UI 155 without requiring the user to move near the TD monitor 151 and desk 250. In this manner, the second transition response provides a more seamless transition from the VR mode to TD mode that reduces disruption of user's workflow and improves user efficiency.

In some embodiments, a third transition comprises a transition from a current state that includes the VR interface in stationary mode to a next state that includes the VR interface in room-scale mode. In these embodiments, the current state specifies the interface parameter as the VR interface, the position parameter as either seated or standing, and the movement parameter as stationary. The next state specifies the interface parameter as the VR interface, the position parameter as either seated or standing, and the movement parameter as room-scale. Therefore, the movement parameter has changed from stationary in the current state to room-scale in the next state.

The transition engine 115 then determines a third transition response corresponding to the third transition using the transition table 140. The third transition response specifies a set of operations to be automatically performed by the transition engine 115 to configure the VR engine 112 to display the VR scene 175 in a particular manner when the third transition is detected that reduces the disruption and inefficiency caused by third transition. In particular, the third transition response specifies that one or more virtual components corresponding to one or more items or components of the room area 210 are displayed in the VR scene 175 to have an opacity/transparency based on a distance of the user from the TD monitor 151 or the desk 250.

To illustrate, in the current state, the hybrid workstation 100 is in VR mode (the VR headset 171 is activated) and the user is in stationary mode (the user is within the desk area 251). In the current state, the user is viewing the VR scene 175 that displays the virtual desk 650, the virtual TD monitor 651 (displaying the virtual TD UI 655), and the virtual TD keyboard 653 with a "normal" appearance having an opacity value of 1. The user then leaves the desk area and begins moving around the movement area 252, which transitions the hybrid workstation 100 to the next state in room-scale mode. In the next state, while in room-scale mode, the virtual desk 650 and other virtual components may not be very useful to the user, and can occlude the user's view of the virtual environment.

Therefore, in the embodiments herein, when the transition engine 115 detects that the third transition has occurred, the transition engine 115 identifies the third transition response from the transition table 140. The transition engine 115 then executes the third transition response to reconfigure the VR scene 175 to display one or more virtual components to have a visual appearance based on a distance from the user to the TD monitor 151 or desk 250. In particular, the one or more virtual components are displayed in the VR scene 175 to be more transparent (have less opacity) as the distance from the user to the TD monitor 151 or desk 250 increases. In this manner, as the user moves farther from the physical TD monitor 151 or desk 250, the one or more virtual components become less visible (more transparent) in the VR scene 175. In these embodiments, the one or more virtual components can include the virtual desk 650, virtual TD monitor 651, the virtual TD UI 655, and/or the TD keyboard 653. In other embodiments, the one or more virtual components can include other virtual components corresponding to other items or components within the room area 210.

In particular, the third transition response can specify that the one or more virtual components in the VR scene 175 are to be displayed having a lesser opacity (greater transparency) when the user is determined to be a greater distance from the TD monitor 151 or desk 250, and are to be displayed having a greater opacity (lesser transparency) when the user is determined to be a shorter distance from the TD monitor 151 or desk 250. For example, the third transition response can specify that a virtual component in the VR scene 175 is to be displayed having a first opacity value when the user is determined to be a first distance from the TD monitor 151 or desk 250, and is to be displayed having a second opacity value when the user is determined to be a second distance from the TD monitor 151 or desk 250, wherein the first opacity value is less than the second opacity value, and the first distance is greater than the second distance. In some embodiments, the relationship between the opacity value of a virtual component and the distance of the user from the TD monitor 151 or desk 250 can be expressed by a linear equation. In this manner, the transition engine 115 can configure the opacity values of the one or more virtual components in the VR scene 175 to continually decrease in value as the distance from the user to the TD monitor 151 or desk 250 continually increases.

In other embodiments, when the user is within a first threshold distance to the TD monitor 151 or desk 250, the one or more virtual components in the VR scene 175 will be displayed with the "normal" opacity value of 1. When the user is outside a second threshold distance to the TD monitor 151 or desk 250, the one or more virtual components in the VR scene 175 will be displayed with an opacity value of 0 so that the one or more virtual components are not visible within the VR scene 175. When the user is between the first threshold distance and the second threshold distance to the TD monitor 151 or desk 250, the one or more virtual components in the VR scene 175 will be displayed with an opacity value of less than 1 and greater than 0. In these embodiments, the first threshold distance is less than the second threshold distance.

As discussed above in relation to the second transition, the tracking devices 173 track the 3D position of the VR headset 171, the VR controller 172, the TD monitor 151, and the desk 250. Therefore, the position of the user within the room area 210 can be inferred from the location of the VR headset 171 or the VR controller 172 within the room area 210. Thus, the distance between the user and the TD monitor 151 or desk 250 can be determined by determining the distance between the VR headset 171 or VR controller 172 and the TD monitor 151 or desk 250. The distance between the VR headset 171 or VR controller 172 and the TD monitor 151 or desk 250 can be determined by analyzing the tracking data generated by the tracking devices 173.

Optionally, the third transition response also specifies that a visual guidance is to be displayed in the VR scene 175 to assist the user in finding a way back to the physical TD monitor 151 and desk 250. For example, the third transition response can specify that a faint line or path is displayed on the floor in the VR scene 175 from the user's current position within the VR scene 175 to the locations of the virtual desk 650 and the virtual TD monitor 651 within the VR scene 175.

As described above, the third transition response automatically makes adjustments to the VR scene 175 that causes one or more virtual components in the VR scene 175 to be displayed with less opacity than normal after switching from stationary mode to room-scale mode while in VR mode. Therefore, the third transition response automatically provides a less occluded view of the VR scene 175 by removing obstructing elements that are not needed in room-scale mode. In this manner, the third transition response provides a more seamless transition between the stationary to room-scale modes while in VR mode that reduces disruption of user's workflow and improves user efficiency.

In some embodiments, a fourth transition comprises a transition from a current state that includes the VR interface in room-scale mode to a next state that includes the VR interface in stationary mode. In these embodiments, the current state specifies the interface parameter as the VR interface, the position parameter as either seated or standing, and the movement parameter as room-scale. The next state specifies the interface parameter as the VR interface, the position parameter as either seated or standing, and the movement parameter as stationary. Therefore, the movement parameter has changed from room-scale in the current state to stationary in the next state.

The transition engine 115 then determines a fourth transition response corresponding to the fourth transition using the transition table 140. The fourth transition response specifies a set of operations to be automatically performed by the transition engine 115 to configure the VR engine 112 to display the VR scene 175 in a particular manner and/or to configure the VR controller 172 to operate in a particular manner when the fourth transition is detected that reduces the disruption and inefficiency caused by fourth transition. In particular, the fourth transition response specifies that one or more virtual components are displayed in the VR scene 175 to have an opacity/transparency based on a distance of the user from the TD monitor 151 or the desk 250. The fourth transition response also specifies that if the user places the VR controller 172 on the desk 250, the VR controller 172 is to be configured to simulate the operations and functions of a TD mouse.

To illustrate, in the current state, the hybrid workstation 100 is in VR mode and the user is in room-scale mode. In the current state, the user is viewing the VR scene 175 that displays the one or more virtual components with an opacity value that is less than 1, depending on the distance between the user and the TD monitor 151 or desk 250, as discussed above in relation to the third transition. When in room-scale mode in the current state, the user is moving around within the movement area 252. The user then moves to within the desk area 251, which transitions the hybrid workstation 100 to the stationary mode. In some embodiments, fourth transition response specifies that when the state switches from room-scale mode to stationary mode while in VR mode, the one or more virtual components in the VR scene 175 are displayed with the "normal" opacity value of 1. The one or more virtual components can include the virtual desk 650, virtual TD monitor 651, the virtual TD UI 655, and/or the TD keyboard 653. In other embodiments, the one or more virtual components can include other virtual components corresponding to other items or components of the room area 210. Optionally, the fourth transition response also specifies that a visual guidance (such as a faint line or path) previously displayed in the VR scene 175 in the current state, is to be removed from the VR scene 175 when transitioning to the next state in stationary mode.

When in the next state in stationary mode, the VR scene 175 displays the virtual TD UI 655 with the "normal" opacity value of 1, which allows the user to interact with the virtual TD UI 655 within the VR scene 175. The fourth transition response also specifies that if the user places the VR controller 172 on a flat/horizontal surface of the desk 250, the VR controller 172 is to be configured to simulate the operations and functions of a TD mouse. When the user places the VR controller 172 on the flat/horizontal surface of the desk 250, the user is indicating that the user wishes to use the VR controller 172 as a TD mouse. In these embodiments, the user can use the VR controller 172 to interact with the virtual TD UI 655 within the VR scene 175 by moving the VR controller 172 along the flat surface of the desk 250. When the VR controller 172 is moved along the surface of the desk 250, the VR controller 172 is moving in only two dimensions similar to a conventional input device. When executing the fourth transition response, the transition engine 115 reconfigures the VR controller 172 to simulate a TD mouse by mapping the 2D movement of the VR controller 172 on the desk 250 to the 2D movement of a conventional mouse. The transition engine 115 also reconfigures one or more buttons of the VR controller 172 to simulate a TD mouse by mapping one or more buttons of the VR controller 172 to one or more functions of one or more buttons of a conventional mouse. For example, the transition engine 115 can map a first button of the VR controller 172 to a "right-click" function of a right button of a conventional mouse, and map a second button of the VR controller 172 to a "left-click" function of a left button of a conventional mouse.

As discussed above in relation to FIG. 2, the hybrid workstation 100 includes tracking devices 173 that track the 3D position of the various items and components within the room area 210, including the VR controller 172 and the desk 250. Therefore, the transition engine 115 can detect when the VR controller 172 is placed on the desk 250, which triggers the fourth transition response. Note that since the VR scene 175 displays a virtual desk 650 that is location aligned with the physical desk 250 in the real-world room area 210, the virtual desk 650 can provide visual guidance to the user for where to place the VR controller 172 to trigger the fourth transition response.

As described above, the fourth transition response automatically makes display adjustments to the VR scene 175 that causes one or more virtual components (including the virtual TD UI 655) in the VR scene 175 to be displayed with normal opacity after switching from room-scale mode to stationary mode while in VR mode. In addition, the fourth transition response can automatically reconfigure the VR controller 172 to simulate the operations and functions of a TD mouse when the VR controller 172 is placed on the desk 250. Therefore, the fourth transition response allows the user to interact with the virtual TD UI 655 with a simulated TD mouse that operates in 2D, which provides greater precision and long-term comfort than interacting with the virtual TD UI 655 via the VR controller 172 operating in 3D. In this manner, the fourth transition response provides a more seamless transition between the room-scale to stationary modes while in VR mode that reduces disruption of user's workflow and improves user efficiency.

In some embodiments, a fifth transition comprises a transition from a current state that includes the VR interface in standing mode to a next state that includes the VR interface in seated mode. In these embodiments, the current state specifies the interface parameter as the VR interface, the position parameter as standing, and the movement parameter as either stationary or room-scale. The next state specifies the interface parameter as the VR interface, the position parameter as seated, and the movement parameter as either stationary or room-scale. Therefore, the position parameter has changed from standing in the current state to seated in the next state.

The transition engine 115 then determines a fifth transition response corresponding to the fifth transition using the transition table 140. The fifth transition response specifies a set of operations to be automatically performed by the transition engine 115 to configure the VR engine 112 to display the VR scene 175 in a particular manner when the fifth transition is detected that reduces the disruption and inefficiency caused by fifth transition. In particular, the fifth transition response specifies that the VR scene 175 is to be rendered to continue to show a user viewpoint from a standing pose/position and is not to be rendered to show a user viewpoint from a seated pose/position. Therefore, the fifth transition response configures the VR scene 175 such that the user does do not perceive a change in viewpoint height within the VR scene 175 when physically sitting down on a chair. In this manner, the user can retain the desirable higher standing viewpoint height within the VR scene 175, while sitting comfortably in a chair in the real-world.

As discussed above in relation to FIG. 2, the hybrid workstation 100 includes tracking devices 173 that track the 3D position of the various items and components within the room area 210, including the VR headset 171. Therefore, the transition engine 115 can detect when the user is standing or seated based on the height of the tracked VR headset 171. When the transition engine 115 detects that the fifth transition has occurred when the user has switched to the seated pose while in VR mode, the transition engine 115 and identifies the fifth transition response from the transition table 140. The transition engine 115 then executes the fifth transition response to configure the VR scene 175 to continue rendering the viewpoint height corresponding to the standing pose, rather than switching to a viewpoint height corresponding to the seated pose.

As described above, the fifth transition response automatically makes adjustments to the VR scene 175 that retain the standing viewpoint within the VR scene 175 when switching to the seated pose while in VR mode. Therefore, the fifth transition response allows the user to interact with the VR scene 175 with the more desirable standing viewpoint within the VR scene 175, while sitting comfortably in a chair in the real-world.

Technique for Transitioning Between States of a Hybrid Workstation

Figure 8:
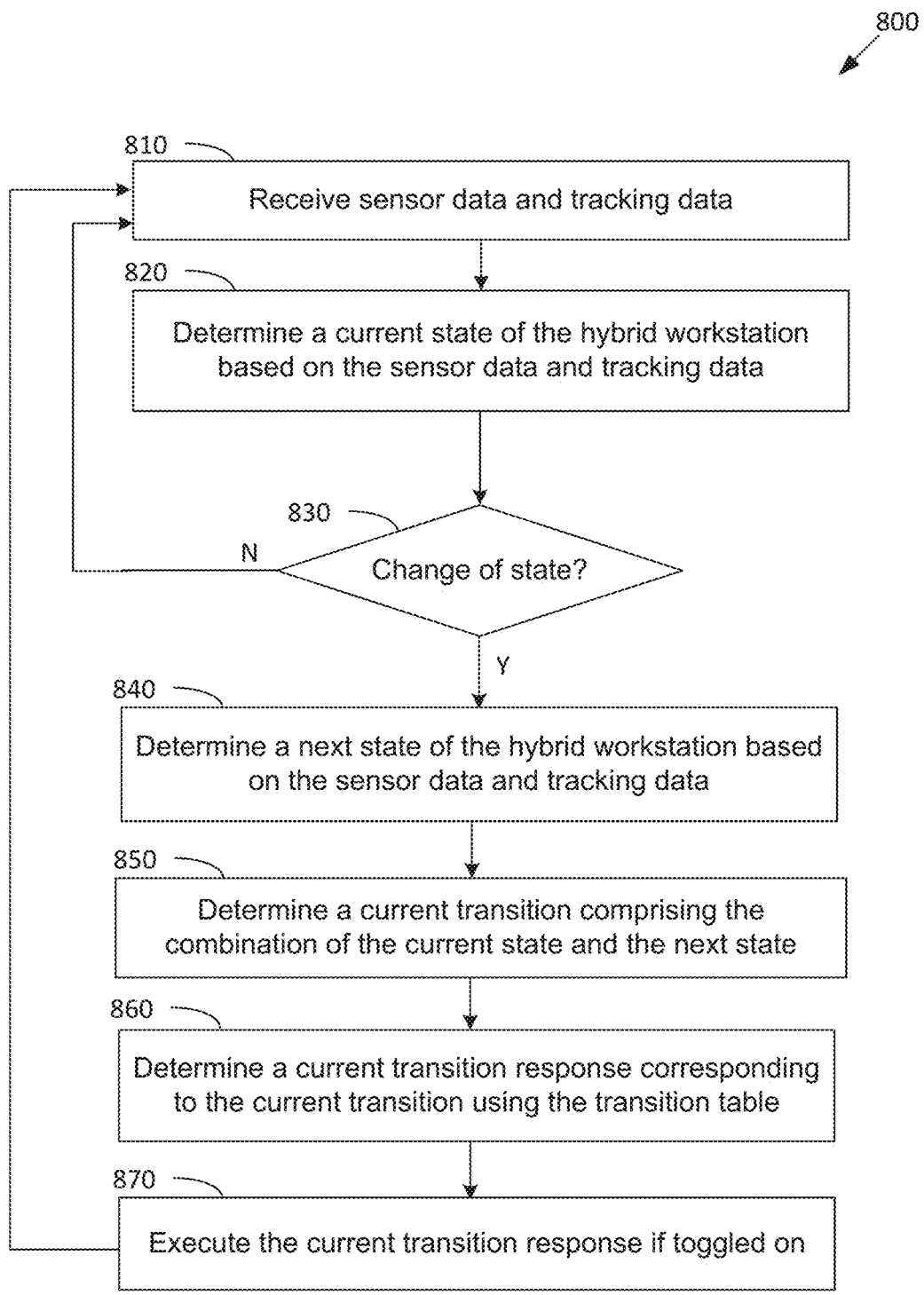
FIG. 8 is a flow diagram of method steps for performing transitions between different states of a hybrid workstation, according to various embodiments.

FIG. 8 is a flow diagram of method steps for performing transitions between different states of a hybrid workstation, according to various embodiments. Although the method steps are described in conjunction with the systems of FIGS. 1-7, persons skilled in the art will understand that the method steps can be performed in any order by any system. In some embodiments, the method 800 can be performed by the hybrid workstation 100.

The method 800 begins when the transition engine 115 receives (at step 810) sensor data from the VR headset 171 and tracking data from the one or more tracking devices 173. The VR headset 171 includes a built-in proximity sensor that detects when the VR headset 171 is placed over the head of the user (which activates the VR headset 171) and when the VR headset 171 is removed from the head of the user (which de-activates the VR headset 171). The VR headset 171 transmits the sensor data to the transition engine 115. The one or more tracking devices 173 track the 3D position of the various items and components within the room area 210, including the VR headset 171, VR controller 172, the desk 250, the TD monitor 151, the TD mouse 152, and/or the TD keyboard 153. The tracking devices 173 generate tracking data comprising 3D space information for the various items and components within the room area 210, and transmits the tracking data to the transition engine 115. The transition engine 115 continues to receive the sensor data and tracking data throughout the duration of the method 800.

The transition engine 115 determines (at step 820) a current state of the hybrid workstation 100 by analyzing the received sensor data and tracking data. The hybrid workstation 100 is associated with a plurality of unique states, each state being defined by a unique combination of three parameters including the interface, position, and movement parameters. The transition engine 115 determines a value of each parameter to determine the current state of the hybrid workstation 100. The interface parameter specifies either the VR interface (the VR headset 171 is activated) or the TD interface (the VR headset 171 is de-activated), which the transition engine 115 determines from the sensor data received from the VR headset 171. The position parameter specifies either the seated position or the standing position, which the transition engine 115 determines from the tracking data received from the tracking devices 173. The movement parameter specifies either stationary movement or room-scale movement, which the transition engine 115 determines from the tracking data received from the tracking devices 173.

The transition engine 115 then determines (at step 830) if a change of state of the hybrid workstation 100 has occurred. The transition engine 115 determines that a change of state of the hybrid workstation 100 has occurred if the hybrid workstation 100 detects that any of the parameters (interface, position, and movement) change in value from the current state based on the sensor data and tracking data. If not (at step 830-No), the method 800 continues at step 810 whereby the transition engine 115 continues to receive the sensor data and tracking data. If so (at step 830-Yes), the method 800 continues at step 840.

At step 840, the transition engine 115 determines a next state of the hybrid workstation 100 based on the sensor data and tracking data. In particular, the transition engine 115 determines the particular parameter that has changed in value from the current state and the new value for the particular parameter to determine the next state. The transition engine 115 then determines (at step 850) a current transition that has occurred at steps 830 and 840. The hybrid workstation 100 is associated with a plurality of unique transitions, each transition being defined by a unique combination of a current state and a next state. Therefore, the transition engine 115 determines the current transition by combining the current state (determined at step 820) and a next state (determined at step 840).

The transition engine 115 then determines (at step 860) a current transition response corresponding to the current transition using the transition table 140. The transition table 140 comprises a plurality of entries 501, each entry 501 mapping a unique transition to a particular transition response. Each transition response specifies a set of operations to be performed on one or more components of the VR interface and/or the TD interface. Each entry 501 also indicates if the transition response has been toggled "on" or "off" by the user. The transition engine 115 then executes (at step 870) the current transition response if the user has toggled the current transition response to "on," as indicated by the transition table 140. If the user has toggled the current transition response to "off," the transition engine 115 does not execute the current transition response at step 870. The method 800 then continues at step 810.

In sum, a hybrid workstation enables a VR interface, a TD interface, and transitions between the interfaces while performing various workflows and tasks in a user application. The state of the hybrid workstation is defined by three parameters comprising interface (VR interface or TD interface), position (seated or standing), and movement (stationary or room-scale). The hybrid workstation detects a transition (change) in the state of the hybrid workstation upon determining that any of the three parameters have changed. If so, the hybrid workstation has detected a transition from a current state to a next state of the hybrid workstation. The hybrid workstation then determines a transition response corresponding to the particular transition that is detected. The transition response comprises a set of operations that are performed on one or more software or hardware components of the VR interface and/or the TD interface.

At least one technical advantage of the disclosed techniques relative to the prior art is that the disclosed techniques enable transitions between VR interfaces and TD interfaces in computing environments that are less disruptive and cumbersome for users. Among other things, the disclosed techniques determine and execute a particular transition response based on a detected transition (from the VR interface to the TD interface or from the TD interface to the VR interface). The transition response includes one or more operations that are performed on the VR interface and/or the TD interface that automatically effect a transition from one interface to the other without any required user action. In this manner, the disclosed techniques are able to improve the efficiency with which users perform workflows and tasks and improve the overall user-experience relative to prior art systems. These technical advantages represent one or more technological improvements over prior art approaches.

Aspects of the subject matter described herein are set out in the following numbered clauses.

1. In some embodiments, a computer-implemented method for transitioning between states of a hybrid workstation, the method comprising: determining a first state of the hybrid workstation, wherein the hybrid workstation is associated with a plurality of states, each state is defined by at least a first parameter that specifies a first interface for interacting with the hybrid workstation or a second interface for interacting with the hybrid workstation, the first interface comprises a two dimensional (2D) interface, and the second interface comprises a three dimensional (3D) interface; in response to detecting that the first parameter has changed, determining a first transition from the first state to a second state of the hybrid workstation; identifying a first transition response corresponding to the first transition; and executing the first transition response on at least one of the first interface or the second interface.

2. The computer-implemented method of clause 1, wherein: the first interface displays a 2D representation of a virtual environment; and the second interface displays a 3D representation of the virtual environment.

3. The computer-implemented method of any of clauses 1-2, wherein: the first interface includes a monitor that displays a user interface and an input device that interacts with the user interface; and the second interface includes a virtual reality (VR) headset that displays a VR scene and a VR controller that interacts with the VR scene.

4. The computer-implemented method of any of clauses 1-3, wherein: the first transition comprises a transition from the first interface to the second interface; and the first transition response specifies that an input device associated with the first interface should be configured to operate with the second interface.

5. The computer-implemented method of any of clauses 1-4, wherein: the first transition comprises a transition from the second interface to the first interface; and the first transition response specifies that a user interface (UI) generated by the first interface should be configured to display at least one UI element having a size that is based on a distance of a user from a monitor that displays the UI.

6. The computer-implemented method of any of clauses 1-5, wherein each state is further defined by at least a second parameter that specifies a stationary mode or a room-scale mode, and further comprising: determining a third state of the hybrid workstation that implements the second interface and the stationary mode; in response to detecting that the second parameter has changed, determining a second transition from the third state to a fourth state of the hybrid workstation that implements the second interface and the room-scale mode; and identifying a second transition response corresponding to the second transition.

7. The computer-implemented method of any of clauses 1-6, wherein the second transition response specifies that a scene generated by the second interface should be configured to display a virtual component representing a monitor associated with the first interface to have an opacity value based on a distance of a user from the monitor.

8. The computer-implemented method of any of clauses 1-7, wherein each state is further defined by at least a second parameter that specifies a stationary mode or a room-scale mode, and further comprising: determining a third state of the hybrid workstation that implements the second interface and the room-scale mode; in response to detecting that the second parameter has changed, determining a second transition from the third state to a fourth state of the hybrid workstation that implements the second interface and the stationary mode; and identifying a second transition response corresponding to the second transition.

9. The computer-implemented method of any of clauses 1-8, wherein the second transition response specifies that a controller associated with the second interface should be configured to simulate an input device associated with the first interface.

10. In some embodiments, one or more non-transitory computer-readable media including instructions that, when executed by one or more processors, cause the one or more processors to transition between states of a hybrid workstation by performing the steps of: determining a first state of the hybrid workstation, wherein the hybrid workstation is associated with a plurality of states, each state is defined by at least a first parameter that specifies a first interface for interacting with the hybrid workstation or a second interface for interacting with the hybrid workstation, the first interface comprises a two dimensional (2D) interface, and the second interface comprises a three dimensional (3D) interface; in response to detecting that the first parameter has changed, determining a first transition from the first state to a second state of the hybrid workstation; identifying a first transition response corresponding to the first transition; and executing the first transition response on at least one of the first interface or the second interface.

11. The one or more non-transitory computer-readable media of clause 10, wherein: the first interface includes a monitor that displays a user interface and an input device that interacts with the user interface; and the second interface includes a virtual reality (VR) headset that displays a VR scene and a VR controller that interacts with the VR scene.

12. The one or more non-transitory computer-readable media of any of clauses 10-11, wherein: the first transition comprises a transition from the first interface to the second interface; and the first transition response specifies that an input device associated with the first interface should be configured to operate with the second interface.

13. The one or more non-transitory computer-readable media of any of clauses 10-12, wherein the first transition response further specifies that the input device associated with the first interface should be configured not to operate with the first interface.

14. The one or more non-transitory computer-readable media of any of clauses 10-13, wherein: the first transition comprises a transition from the second interface to the first interface; and the first transition response specifies that a user interface (UI) generated by the first interface should be configured to display at least one UI element having a size that is based on a distance of a user from a monitor that displays the UI.

15. The one or more non-transitory computer-readable media of any of clauses 10-14, wherein the first transition response specifies that the user interface should be configured to display the at least one UI element to have a size that decreases as the distance of the user from the monitor decreases.

16. The one or more non-transitory computer-readable media of any of clauses 10-15, wherein each state is further defined by at least a second parameter that specifies a stationary mode or a room-scale mode, and further comprising: determining a third state of the hybrid workstation that implements the second interface and the stationary mode; in response to detecting that the second parameter has changed, determining a second transition from the third state to a fourth state of the hybrid workstation that implements the second interface and the room-scale mode; and identifying a second transition response corresponding to the second transition.

17. The one or more non-transitory computer-readable media of any of clauses 10-16, wherein the second transition response specifies that a scene generated by the second interface should be configured to display a virtual component representing a monitor associated with the first interface to have an opacity value based on a distance of a user from the monitor.

18. The one or more non-transitory computer-readable media of any of clauses 10-17, wherein the second transition response specifies that the scene should be configured to display the virtual component to have a decreasing opacity value as the distance of the user from the monitor increases.

19. In some embodiments, a hybrid workstation comprising: a memory that includes instructions; and at least one processor that is coupled to the memory and, upon executing the instructions, performs the steps of: determining a first state of the hybrid workstation, wherein the hybrid workstation is associated with a plurality of states, each state is defined by at least a first parameter that specifies a first interface for interacting with the hybrid workstation or a second interface for interacting with the hybrid workstation, the first interface comprises a two dimensional (2D) interface that includes a monitor and an input device, and the second interface comprises a three dimensional (3D) interface that includes a virtual reality (VR) headset and a VR controller; in response to detecting that the first parameter has changed, determining a first transition from the first state to a second state of the hybrid workstation; identifying a first transition response corresponding to the first transition; and executing the first transition response on at least one of the first interface or the second interface.

20. The hybrid workstation of clause 19, wherein the monitor displays a user interface and the input device interacts with the user interface; and the virtual reality (VR) headset displays a VR scene and the VR controller interacts with the VR scene.

Any and all combinations of any of the claim elements recited in any of the claims and/or any elements described in this application, in any fashion, fall within the contemplated scope of the present embodiments and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments can be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." In addition, any hardware and/or software technique, process, function, component, engine, module, or system described in the present disclosure can be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams can represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure can be devised without departing from the basic scope thereof, and the scope thereof is determined by the claims that follow.

What is claimed is:

1. A computer-implemented method for transitioning between states of a hybrid workstation, the method comprising:

determining a first state of the hybrid workstation, wherein the hybrid workstation is associated with a plurality of states, each state is defined by at least a first parameter that specifies a first interface for interacting with the hybrid workstation or a second interface for interacting with the hybrid workstation, the first interface comprises a two dimensional (2D) interface, and the second interface comprises a three dimensional (3D) interface;

in response to detecting that the first parameter has changed, determining a first transition from the first state to a second state of the hybrid workstation;

identifying, from a transition table, a first transition response to perform prior to performing the first transition; and executing the first transition response on at least one of the first interface or the second interface.

2. The computer-implemented method of claim 1, wherein:

the first interface displays a 2D representation of a virtual environment; and the second interface displays a 3D representation of the virtual environment.

3. The computer-implemented method of claim 2, wherein:

the first interface includes a monitor that displays a user interface and an input device that interacts with the user interface; and the second interface includes a virtual reality (VR) headset that displays a VR scene and a VR controller that interacts with the VR scene.

4. The computer-implemented method of claim 1, wherein:

the first transition comprises a transition from the first interface to the second interface; and the first transition response specifies that an input device associated with the first interface should be configured to operate with the second interface.

5. The computer-implemented method of claim 1, wherein:

the first transition comprises a transition from the second interface to the first interface; and the first transition response specifies that a user interface (UI) generated by the first interface should be configured to display at least one UI element having a size that is based on a distance of a user from a monitor that displays the UI.

6. The computer-implemented method of claim 1, wherein each state is further defined by at least a second parameter that specifies a stationary mode or a room-scale mode, and further comprising:

determining a third state of the hybrid workstation that implements the second interface and the stationary mode;

in response to detecting that the second parameter has changed, determining a second transition from the third state to a fourth state of the hybrid workstation that implements the second interface and the room-scale mode; and identifying, from the transition table, a second transition response to perform prior to performing the second transition.

7. The computer-implemented method of claim 6, wherein the second transition response specifies that a scene generated by the second interface should be configured to display a virtual component representing a monitor associated with the first interface to have an opacity value based on a distance of a user from the monitor.

8. The computer-implemented method of claim 1, wherein each state is further defined by at least a second parameter that specifies a stationary mode or a room-scale mode, and further comprising:

determining a third state of the hybrid workstation that implements the second interface and the room-scale mode;

in response to detecting that the second parameter has changed, determining a second transition from the third state to a fourth state of the hybrid workstation that implements the second interface and the stationary mode; and identifying, from the transition table, a second transition response to perform prior to performing the second transition.

9. The computer-implemented method of claim 8, wherein the second transition response specifies that a controller associated with the second interface should be configured to simulate an input device associated with the first interface.

10. One or more non-transitory computer-readable media including instructions that, when executed by one or more processors, cause the one or more processors to transition between states of a hybrid workstation by performing the steps of:

determining a first state of the hybrid workstation, wherein the hybrid workstation is associated with a plurality of states, each state is defined by at least a first parameter that specifies a first interface for interacting with the hybrid workstation or a second interface for interacting with the hybrid workstation, the first interface comprises a two dimensional (2D) interface, and the second interface comprises a three dimensional (3D) interface;

in response to detecting that the first parameter has changed, determining a first transition from the first state to a second state of the hybrid workstation;

identifying, from a transition table, a first transition response to perform prior to performing the first transition; and executing the first transition response on at least one of the first interface or the second interface.

11. The one or more non-transitory computer-readable media of claim 10, wherein:

the first interface includes a monitor that displays a user interface and an input device that interacts with the user interface; and the second interface includes a virtual reality (VR) headset that displays a VR scene and a VR controller that interacts with the VR scene.

12. The one or more non-transitory computer-readable media of claim 10, wherein:

the first transition comprises a transition from the first interface to the second interface; and the first transition response specifies that an input device associated with the first interface should be configured to operate with the second interface.

13. The one or more non-transitory computer-readable media of claim 12, wherein the first transition response further specifies that the input device associated with the first interface should be configured not to operate with the first interface.

14. The one or more non-transitory computer-readable media of claim 10, wherein:
the first transition comprises a transition from the second interface to the first interface; and
the first transition response specifies that a user interface (UI) generated by the first interface should be configured to display at least one UI element having a size that is based on a distance of a user from a monitor that displays the UI.

15. The one or more non-transitory computer-readable media of claim 14, wherein the first transition response specifies that the user interface should be configured to display the at least one UI element to have a size that decreases as the distance of the user from the monitor decreases.

16. The one or more non-transitory computer-readable media of claim 10, wherein each state is further defined by at least a second parameter that specifies a stationary mode or a room-scale mode, and further comprising:
determining a third state of the hybrid workstation that implements the second interface and the stationary mode;
in response to detecting that the second parameter has changed, determining a second transition from the third state to a fourth state of the hybrid workstation that implements the second interface and the room-scale mode; and
identifying, from the transition table, a second transition response to perform prior to performing the second transition.

17. The one or more non-transitory computer-readable media of claim 16, wherein the second transition response specifies that a scene generated by the second interface should be configured to display a virtual component representing a monitor associated with the first interface to have an opacity value based on a distance of a user from the monitor.

18. The one or more non-transitory computer-readable media of claim 17, wherein the second transition response specifies that the scene should be configured to display the virtual component to have a decreasing opacity value as the distance of the user from the monitor increases.

19. A hybrid workstation comprising:
a memory that includes instructions; and
at least one processor that is coupled to the memory and, upon executing the instructions, performs the steps of:
determining a first state of the hybrid workstation, wherein the hybrid workstation is associated with a plurality of states, each state is defined by at least a first parameter that specifies a first interface for interacting with the hybrid workstation or a second interface for interacting with the hybrid workstation, the first interface comprises a two dimensional (2D) interface that includes a monitor and an input device, and the second interface comprises a three dimensional (3D) interface that includes a virtual reality (VR) headset and a VR controller;
in response to detecting that the first parameter has changed, determining a first transition from the first state to a second state of the hybrid workstation;
identifying, from a transition table, a first transition response to perform prior to performing the first transition; and
executing the first transition response on at least one of the first interface or the second interface.

20. The hybrid workstation of claim 19, wherein
the monitor displays a user interface and the input device interacts with the user interface; and
the virtual reality (VR) headset displays a VR scene and the VR controller interacts with the VR scene.

* * * * *